US007063264B2

(12) United States Patent
Bi et al.

(10) Patent No.: US 7,063,264 B2
(45) Date of Patent: Jun. 20, 2006

(54) COVERT VARIABLE INFORMATION ON IDENTIFICATION DOCUMENTS AND METHODS OF MAKING SAME

(75) Inventors: Daoshen Bi, Boxborough, MA (US); Robert Jones, Andover, MA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 10/330,032

(22) Filed: Dec. 24, 2002

(65) Prior Publication Data

US 2003/0173406 A1    Sep. 18, 2003

Related U.S. Application Data

(60) Provisional application No. 60/371,335, filed on Apr. 9, 2002, provisional application No. 60/344,686, filed on Dec. 24, 2001.

(51) Int. Cl.
*G06K 19/00* (2006.01)

(52) U.S. Cl. .................. 235/487; 235/491; 235/462.04

(58) Field of Classification Search ................ 235/380, 235/382, 382.5, 487, 462.04, 491
See application file for complete search history.

(56) References Cited

U.S. PATENT DOCUMENTS

| 4,522,881 A | 6/1985 | Kobayashi et al. ......... 428/336 |
| 4,599,259 A | 7/1986 | Kobayashi et al. ......... 428/204 |
| 4,627,997 A | 12/1986 | Ide .............................. 428/216 |
| 4,866,025 A | 9/1989 | Byers et al. ................. 503/227 |
| 4,866,027 A | 9/1989 | Henzel ........................ 503/227 |
| 4,871,714 A | 10/1989 | Byers et al. ................. 503/227 |
| 4,876,234 A | 10/1989 | Henzel ........................ 503/227 |
| 4,876,237 A | 10/1989 | Byers et al. ................. 503/227 |
| 4,891,351 A | 1/1990 | Byers et al. ................. 503/227 |
| 5,006,503 A | 4/1991 | Byers et al. ................. 503/227 |
| 5,011,816 A | 4/1991 | Byers et al. ................. 503/227 |
| 5,079,411 A * | 1/1992 | Lee ............................. 235/382 |
| 5,089,350 A | 2/1992 | Talvalkar et al. ........... 428/484 |
| 5,157,424 A | 10/1992 | Craven et al. .............. 346/160 |
| 5,270,526 A * | 12/1993 | Yoshihara .................... 235/487 |
| 5,380,044 A | 1/1995 | Aitkens et al. ............... 283/67 |
| 5,380,695 A | 1/1995 | Chiang et al. .............. 503/227 |
| 5,421,869 A | 6/1995 | Gundjian et al. ......... 106/21 R |
| 5,514,860 A | 5/1996 | Berson ........................ 235/468 |
| 5,516,362 A | 5/1996 | Gundjian et al. ......... 106/22 B |
| 5,522,623 A | 6/1996 | Soules et al. ................. 283/91 |
| 5,525,403 A * | 6/1996 | Kawabata et al. ....... 428/32.79 |
| 5,654,105 A | 8/1997 | Obringer et al. ............ 428/483 |
| 5,683,774 A | 11/1997 | Faykish et al. ............. 428/40.1 |

(Continued)

FOREIGN PATENT DOCUMENTS

EP    0356980 B1    5/1992

(Continued)

OTHER PUBLICATIONS

PCT—Notification of Transmittal of the International Search Report or the Declaration, for International Application No. PCT/USO2/41680, mailed on Jun. 5, 2003.

(Continued)

*Primary Examiner*—Karl D. Frech
(74) *Attorney, Agent, or Firm*—Digimarc Corporation

(57) ABSTRACT

In one embodiment, a method for manufacturing an identification document is provided. A substrate is provided that is constructed and arranged to receive printing thereon. A first variable indicium is printed on the substrate, where the first variable indicium is not visible to the human eye in ambient light but is visible to the human eye when viewed using a first type of light.

7 Claims, 14 Drawing Sheets

U.S. PATENT DOCUMENTS

| | | | |
|---|---|---|---|
| 5,714,291 A | 2/1998 | Marinello et al. | 430/106 |
| 5,935,694 A | 8/1999 | Olmstead et al. | 428/212 |
| 5,944,881 A | 8/1999 | Mehta et al. | 106/31.28 |
| 5,965,242 A | 10/1999 | Patton et al. | 428/195 |
| 5,988,820 A | 11/1999 | Huang et al. | 359/530 |
| 6,064,414 A | 5/2000 | Kobayashi et al. | 347/172 |
| 6,066,594 A | 5/2000 | Gunn et al. | 503/227 |
| 6,071,855 A | 6/2000 | Patton et al. | 503/227 |
| 6,110,864 A | 8/2000 | Lu | 503/227 |
| 6,146,032 A | 11/2000 | Dunham | 400/120.18 |
| 6,155,605 A | 12/2000 | Bratchley et al. | 283/72 |
| 6,174,400 B1 * | 1/2001 | Krutak et al. | 428/32.6 |
| 6,234,537 B1 | 5/2001 | Gutmann et al. | 283/86 |
| 6,368,684 B1 | 4/2002 | Onishi et al. | 428/29 |
| 6,380,131 B1 | 4/2002 | Griebel et al. | 503/227 |
| 6,400,386 B1 | 6/2002 | No | 347/176 |

FOREIGN PATENT DOCUMENTS

| | | |
|---|---|---|
| EP | 0356981 B1 | 5/1992 |
| EP | 0366923 B1 | 5/1992 |
| EP | 0374835 B1 | 11/1992 |
| EP | 0356982 B1 | 12/1992 |
| EP | 0362640 B1 | 12/1992 |
| EP | 0373572 B1 | 3/1993 |
| EP | 0446834 B1 | 6/1994 |
| EP | 0446846 B1 | 8/1994 |
| EP | 0539001 B1 | 6/1995 |
| EP | 0982149 A1 | 3/2000 |
| EP | 1017016 A2 | 7/2000 |
| JP | 6234289 | 8/1994 |
| JP | 11301121 | 11/1999 |
| JP | 11321166 | 11/1999 |
| WO | WO 98/30224 | 9/1998 |
| WO | WO 02/45969 | 6/2002 |
| WO | WO 02/096666 | 12/2002 |

OTHER PUBLICATIONS

PCT—International Search Report for for International Application No. PCT/USO2/41680, mailed on Jun. 5, 2003.

Printed copy of DataCard Group web page entitled "Secure ID Center: Design a Secure ID card Key technologies for a secure ID", 5 printed pages, printed on Dec. 12, 2002 and accessed from: http://www.datacard.com/secureid/secureid_card_technologies_features.shtm.

Printed copy of a Polaroid Press Release, dated Jul. 30, 1998. entitled "Polaroid's Polaprime UV Invisible Ink System Winks at Hollywood As Godzilla's Eye in Promo Display," 2 printed pages, printed on Nov. 26, 2002 and accessed from: http://www.polaroid.com/polinfo/press_releases/august98/080598a.html.

Printed copy of first two pages of a web page entitled "Technologies Overview," 2 printed pages, printed on Dec. 22, 2002 and accessed from: http://www.nfive.com/Articles\2.htm.

Printed copy of first two pages of a Kuro5shin web page entitled "What are 'Dye Sublimation Thermal Printers'? (Technology)", dated Sep. 19, 2003, 2 printed pages, printed on Dec. 22, 2002 and accessed from: http://www.kuro5shin.org/story/2002/9/19/135037/691.

Printed copy of a Raco Industries web page entitled "About Card Printing How it Works," 3 printed pages, printed on Dec. 22, 2002 and accessed from: http://www.racoindustries.com/aboutcardp5.htm.

* cited by examiner (A)

(B)

(C)

(D)

(E)

(F)

(E)

(F)

COVERT VARIABLE INFORMATION ON IDENTIFICATION DOCUMENTS AND METHODS OF MAKING SAME

RELATED APPLICATION DATA

This application is related to the following U.S. provisional patent applications, which were filed Dec. 24, 2001:
  Sensitizing Materials For Laser Engraving (Application No. 60/344,677, Attorney Docket No. P0503—Inventor: Brian LaBrec);
  Full Color Laser Engraved System For Identification Card Imaging (Application No. 60/344,674, Attorney Docket No. P0504—Inventor: Robert Jones);
  Reducing Cracking In Identification Documents (Application No. 60/344,710, Attorney Docket No. P0507—Inventors: Robert Jones and Lori Shah);
  An Inkjet Receiver On Teslin Sheet (Application No. 60/344,685, Attorney Docket No. P0508—Inventors: Daoshen Bi and Drank Dai);
  Laser Engraving Coating System (Application No. 60/344,675, Attorney Docket No. P0515—Inventor: Brain LaBrec);
  Forming Variable Information In Identification Documents By Laser Ablation (Application No. 60/344,676, Attorney Docket No. P0516—Inventor: Brian LaBrec);
  Laser Etched Security Feature (Application No. 60/344,716, Attorney Docket No. P0517—Inventors: George Theodossiou and Robert Jones);
  Manufacture Of Contact Smart Cards (Application No. 60/344,717, Attorney Docket No. P0518—Inventors: Thomas Regan and Robert Jones);
  Manufacture Of Contact-Less Smart Cards (Application No. 60/344,719, Attorney Docket No. P0519—Inventors: Daoshen Bi, Robert Jones and John Lincoln);
  Manufacture Of An All-Pet Identification Document (Application No. 60/344,673, Attorney Docket No. P0520—Inventors: Thomas Regan and Robert Jones);
  Tamper Evident Coating To Combat Heat Intrusion (Application No. 60/344,709, Attorney Docket No. P0521—Inventor: Brian LaBrec);
  Pressure Sensitive UV Curable Adhesive Composition (Application No. 60/344,753, Attorney Docket No. P0522—Inventor: William Rice);
  Heat Activated UV Curable Adhesive Composition (Application No. 60/344,688, Attorney Docket No. P0523—Inventor: William Rice);
  Security Ink With Cohesive Failure (Application No. 60/344,698, Attorney Docket No. P0524—Inventor Bentley Bloomberg);
  Variable Based Identification Documents With Security Features (Application No. 60/344,686, Attorney Docket No. P0525—Inventors: Robert Jones and Daoshen Bi);
  Multiple Image Feature For Identification Document (Application No. 60/344,718, Attorney Docket No. P0526—Inventor: Brian LaBrec);
  Biometric Identification System (Application No. 60/344,682, Attorney Docket No. P0527—Inventor: Thomas Lopolito);
  Identification Document Using Polasecure In Differing Colors (Application No. 60/344,687, Attorney Docket No. P0528—Inventors: Bentley Bloomberg and Robert Jones); and
  Secure Id Card With Multiple Images and Method of Making (Application No. 60/344,683, Attorney Docket No. P0529—Inventor: Brian LaBrec).

The present invention is also related to the following provisional applications:
  Identification Document and Related Methods (Application No. 60/421,254, Attorney Docket No. P0703—Inventors: Geoff Rhoads, et al);
  Image Processing Techniques for Printing Identification Cards and Documents (Application No. 60/371,335—Inventors: Nelson T. Schneck and Charles R. Duggan);
  Shadow Reduction System and Related Techniques for Digital Image Capture (Application No. 60/410,544—Inventors: Scott D. Haigh and Tuan A. Hoang);
  Systems and Methods for Recognition of Individuals Using Combination of Biometric Techniques (Application No. 60/418,129, Attorney Docket No. P0698D—Inventors James Howard and Francis Frazier, filed Oct. 11, 2002);
  Methods of Providing Optical Variable Device for Identification Documents (Application No. 60/429,115, Attorney Docket No. P0720D—Inventors Jones et al.)
  Systems and Methods for Managing and Detecting Fraud in Image Databases Used with Identification Documents (Application No. 60/429,501, Attorney Docket No. P0718D—Inventors James Howard and Francis Frazier, filed Nov. 26, 2002);
  Identification Card Printed with Jet Inks and Systems and Methods of Making Same (Application No. 10/289962, Attorney Docket No. P0708D—Inventors Robert Jones, Daoshen Bi, and Dennis Mailloux, filed Nov. 6, 2002);

The present invention is also related to U.S. patent application Ser. Nos. 09/747,735, filed Dec. 22, 2000, and Ser. No. 09/602,313, filed Jun. 23, 2000, Ser. No. 10/094,593, filed Mar. 6, 2002, U.S. Provisional Patent Application No. 60/358,321, filed Feb. 19, 2002, as well as U.S. Pat. No. 6,066,594.

Each of the above U.S. Patent documents is herein incorporated by reference.

Priority

This application claims the priority of the following U.S. Provisional Applications, the contents of which are incorporated herein by reference in their entirety:
  Variable Based Identification Documents With Security Features (Application No. 60/344,686, Attorney Docket No. P0525—Inventors: Robert Jones and Daoshen Bi, filed Dec. 24, 2001); and
  Image Processing Techniques for Printing Identification Cards and Documents (Application No. 60/371,335, Attorney Docket No. P0609—Inventors: Nelson Schneck and Charles Duggan, filed Apr. 9, 2002); and
  Image Processing Techniques for Printing Identification Cards and Documents (Application No. not yet assigned, filed Nov. 25, 2002—Inventors: Nelson T. Schneck and Charles R. Duggan);

FIELD

The invention relates in general to identification documents and security features for identification documents. In particular, the invention relates to printing covert variable or personal information on identification documents, such that the covert variable or personal information is not identifiable in visible light but is identifiable when viewed in a predetermined non-visible light.

BACKGROUND

Identification Documents

Identification documents (hereafter "ID documents") play a critical role in today's society. One example of an ID document is an identification card ("ID card"). ID documents are used on a daily basis—

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

FIGS. 1 and 2 illustrate a front view and cross-sectional view (taken along the A—A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (also referred to as a substrate). In many applications, the core can be a light-colored, opaque material, such as, for example, white polyvinyl chloride (PVC) material that is, for example, about 25 mil thick. The core 20 is laminated with a transparent material, such as clear PVC material 22, which, by way of example, can be about 1–5 mil thick. The composite of the core 20 and clear PVC material 22 form a so-called "card blank" 25 that can be up to about 30 mils thick. Information 26a–c is printed on the card blank 25 using a method such as Dye Diffusion Thermal Transfer ("D2T2") printing (described further below and also in commonly assigned U.S. Pat. No. 6066594, which is incorporated hereto by reference in its entirety.) The information 26a–c can, for example, comprise an indicium or indicia, such as the invariant or nonvarying information common to a large number of identification documents, for example the name and logo of the organization issuing the documents. The information 26a–c may be formed by any known process capable of forming the indicium on the specific core material used.

To protect the information 26a–c that is printed, an additional layer of overlaminate 24 can be coupled to the card blank 25 and printing 26a–c using, for example, 1 mil of overlaminate. The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976;. in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16 1993 to J. W. Luening, et al. All of the aforementioned documents are hereby incorporated by reference.

Printing Information onto ID Documents

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. Devices such as digital cameras, optical sensors, and scanners also can provide digital image information. The digital image information is utilized to print an image onto a data carrier. For example, information can be printed using a printer having a plurality of small heating elements (e.g., pins) for imagewise heating of each of a series of donor sheets (respectively, carrying diffuseable cyan, magenta and yellow dye). The donor sheets are brought into contact with an image-receiving element (which can, for example, be a substrate) which has a layer for receiving the dyes transferred imagewise from the donor sheets. Thermal dye transfer methods as aforesaid are known and described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Dye diffusion thermal transfer printing ("D2T2") and thermal transfer, (also referred to as mass transfer printing) are two printing techniques that have been used to print information on identification cards. For example, D2T2 has been used to print images and pictures, and thermal transfer has been used to print text, bar codes, and single color graphics.

D2T2 is a thermal imaging technology that allows for the production of photographic quality images. In the art, D2T2 has sometimes been referred to as "dye sub", but D2T2 is not, in fact, really a dye sublimation process. Rather, D2T2 is a diffusion process, and use of the term "D2T2" herein is not intended to include dye sublimation processes. In D2T2 printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. D2T2 can result in a very high printing quality, especially because the energy applied to the thermal printhead can vary to vary the dye density in the image pixels formed on the receiver, to produce a continuous tone image. D2T2 can have an increased cost as compared to other methods, however, because of the special dyes needed and the cost of D2T2 ribbons. Also, the quality of a D2T2-printed image may depend at least on an ability of a mechanical printer system to accurately spatially register a printing sequence, e.g., yellow, magenta, cyan, and black.).

Another thermal imaging technology is thermal or mass transfer printing. With mass transfer printing, a material to be deposited on a receiver (such as carbon black (referred to by the symbol "K")) is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using D2T2. However, mass transfer printing can sometimes be faster than D2T2, and faster printing can be desirable in some situations.

Printing of black ("K") can be accomplished using either D2T2 or mass transfer. For example, black monochrome "K" mass transfer ribbons include Kr (which designates a thermal transfer ribbon) and Kd (which designates dye diffusion).

Both D2T2 and thermal ink have been combined in a single ribbon, which is the well-known YMCK (Yellow-Magenta-Cyan-Black) ribbon (the letter "K" is used to designate the color black in the printing industry). Another panel containing a protectant ("P") or laminate (typically a clear panel) also can be added to the YMCK ribbon)

SUMMARY

Many color images are formed by subtractive techniques, e.g., light is passed through absorbing dyes and the combination of dyes produce an image by sequentially subtracting cyan, magenta, and yellow components to provide the full color image. In the example of a UV fluorescing image, the UV image is formed by light emitting from fluorescing dyes or pigments as they are activated by a UV light energy source. In some implementations, a special pigments or dyes used to form a given image can fluoresce in a first color when exposed to light having a first wavelength and a second color when exposed to light having a second wavelength.

A UV image can be imparted to a document such as an ID document by methods such as thermal printing or D2T2 printing, such as with panels on printing ribbons. For example, a separate dye diffusion panel can include dye having UV properties (e.g., but which does not include a visible spectrum color) to impart an UV image to an ID document, or UV materials can be incorporated into an existing color panel (e.g., into the yellow panel). As the invention proposes herein, a UV image can also be imparted via a mass transfer panel (or thermal mass transfer) panel. Standard dye diffusion printers, such as those manufactured by Atlantek and Eltron, often incorporate both dye diffusion and mass transfer panels. A mass transfer panel typically includes a resin (e.g., a resin including black or color pigments or dyes) that can be thermally transferred to the ID document. A separate mass transfer panel can include pigments or dyes having UV properties to impart a UV image to an ID document, or UV materials can be incorporated into a specially constructed black panel, as described herein. A mass transfer process can be used to produce an image, which is invisible in ordinary light, but glows in UV light.

UV Security Features in ID Documents

One response to the ID document counterfeiting problem has involved the integration of verification features that are difficult to copy by hand or by machine. One such verification feature is the use in the card of a signature of the card's issuer or bearer. Other verification features have involved, for example, the use of watermarks, biometric information, microprinting, fluorescent materials, fine line details, validation patterns or marking, and polarizing stripes. These verification features are integrated into an identification card in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are extremely difficult to manufacture without the requisite know-how, equipment, and materials.

For example, the assignee of the present invention has developed and marketed a proprietary product called Pola-Prime-UV™. PolaPrime-UV™ is a type of security feature One application of PolaPrime-UV™ is for full color photo quality printing of fixed (i.e., not variable data) fluorescent images. The artwork that can be printed using PolaPrime-UV™ includes many images that can be produced with a combination of red, green, and blue phosphors. Under the appropriate light (e.g., a light source capable of providing UV light), the effect seen when viewing an image printed with PolaPrime-UV™ is similar in appearance to a television screen in that the image is formed by emission of light rather than reflection as with ink on paper. To date, Pola-Prime-UV™ has been a reliable authenticator for genuine identification documents. Because PolaPrime-UV™ is a fixed process and has no variable capability, PolaPrime-UV™ has only been used for pre-printed or non-variable data, not personalized or variable full color images.

To date, there have been no examples of printing variable images such as driver's license portraits with UV or IR materials, where the quality of the UV variable image is sufficient to enable the image to be relied upon for identification or authentication.

Because of the enhanced security provided by the use of full color UV printing, it would be advantageous to be able to print variable or personal UV information at the time of card personalization, in one, two, or three UV colors, especially images that have a high enough quality to be used for authentication and/or identification. It also would be advantageous if the same information could be printed in a visible and invisible (e.g., UV) form at substantially the same time or at substantially the same printing step. It would be an advantageous security feature and counterfeit deterrent if, in at least some instances, the visible and invisible information could be printed to appear on the same location of the ID document.

In one aspect, the present invention provides improved ID documents that include printing variable data (e.g., text, personal information, biometric data, etc.) or security features (e.g., images, photographs, codes, digital watermarks, etc.) that are imperceptible to the human eye. When illuminated with UR (or IR) light, however, the variable data or security features become readily visible. The quality of the images produced is such that they are usable for identification and/or authentication.

In another aspect, for at least the printing of UV information that comprises characters or single color images (e.g., simple logos or graphics), the inventors have discovered that using a thermal transfer approach to print full color UV images can overcome at least some of the problems that can be seen when printing UV information using D2T2 printing. In one embodiment, thermally diffusible UV dyes are used with a mass transfer medium, resulting in a UV image that is disposed both on top of and into the medium to which the UV image is printed. Having an image that is formed both on top of and into a medium can increase the security of the image that was printed, because even if the portion of the image that is on "top" of the medium is removed (e.g., in an attempt at alteration), the portion of the image that is disposed "into" the medium remains.

In one embodiment, an identification document is provided comprising first and second layers. The first layer has a first layer a first colored variable indicium formed thereon that is visible to the human eye as a substantially full color image when the first colored variable indicium is viewed using a first type of light. The second layer is operably coupled to the first layer and has a second colored variable indicium that is visible to the human eye as having the appearance of a substantially full color image when the second colored variable indicium is viewed using a second type of light. The second colored variable indicium can be printed using a thermally diffuseable non visible dye disposed in a resin panel on a thermal transfer printing ribbon.

In another aspect, the invention provides a method for printing a UV image at the same time that it prints a full color image. The UV dye is selected so to be a thermally diffusible UV fluorescent dye that diffuses with substantially the same properties as the visible dyes on the panel.

In a further aspect, the image to be printed in UV is digitally manipulated so that a UV image is printed on an identification document using only two of the three colors, printing a so-called "false two color" UV image. In one embodiment, the two colors comprise yellow and at least one of cyan and magenta. The "false two color" UV image is printed using UV dyes. We have found that one, two or three UV colors, as well as false two color, images printed in accordance with the invention can be of "identification quality" (i.e., good enough discernibility enough to be used for identification purposes).

In one embodiment, a method for manufacturing an identification document is provided. A substrate is provided that is constructed and arranged to receive printing thereon. A first variable indicium is printed on the substrate, where the first variable indicium is not visible to the human eye in ambient light but is visible to the human eye when viewed using a first type of light.

In one embodiment, the invention provides a method for manufacturing an identification document. A substrate is provided that is constructed and arranged to receive thermal transfer printing thereon. A first variable indicium is printed on the substrate using a thermal transfer ribbon, the thermal transfer ribbon comprising at least one panel, the panel comprising a thermally diffuseable dye dissolved in a resin, where the dye comprises at least one component that is not visible to the human eye in ambient light.

The foregoing and other objects, features and advantages of the present invention will be even more readily apparent from the following Detailed Description, which proceeds with reference to the accompanying drawings, and from the claims.

BRIEF DESCRIPTION OF THE DRAWINGS

The advantages, features, and aspects of embodiments of the invention will be more fully understood in conjunction with the following detailed description and accompanying drawings, wherein:

FIG. 14a is a photographic color image including a headshot of a human subject;

FIG. 14b illustrates the image of FIG. 14a with its contrast improved;

FIG. 14c emphasizes the horizontal edges of the FIG. 14b image;

FIG. 14d emphasizes the vertical edges of the FIG. 14b image;

FIG. 14e illustrates a composite image of FIGS. 14c and 14d;

FIG. 14f illustrates a binaryized version of FIG. 14e; and

FIG. 14g illustrates an inverted version of FIG. 14f.

The drawings are not necessarily to scale, emphasis instead generally being placed upon illustrating the principles of the invention. In addition, in the figures, like numbers refer to like elements.

DETAILED DESCRIPTION OF THE INVENTION

Terminology

Figure 1:
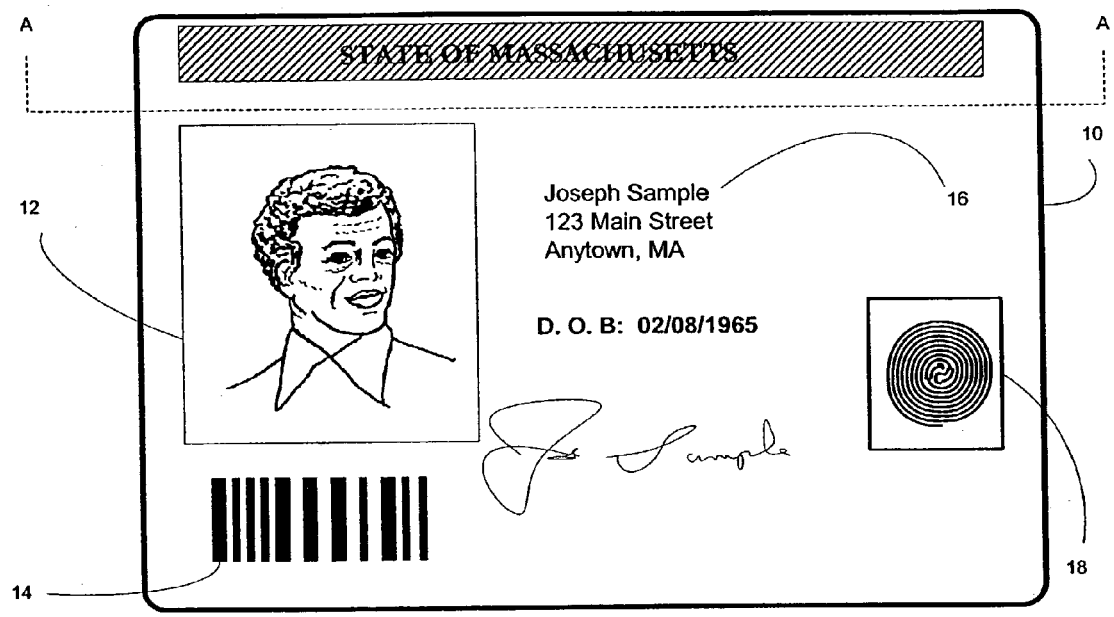
FIG. 1 is an illustrative example of a prior art identification document.
Figure 2:
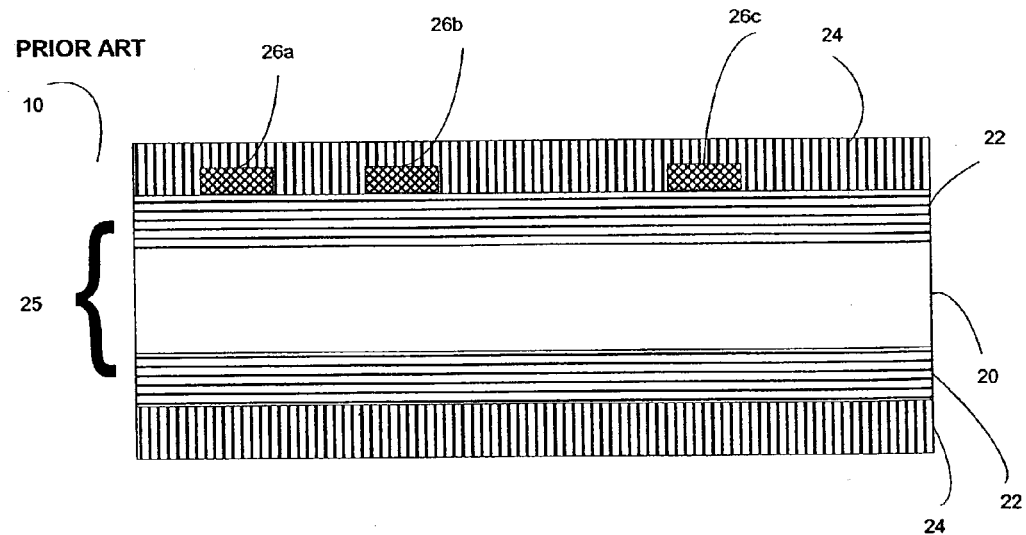
FIG. 2 is an illustrative cross section of the prior art identification document of FIG. 1, taken along the A—A line.

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light source), provide a discernable image that is usable for identification or authentication purposes.

There are a number of reasons why an image or information on an ID document might not qualify as an "identification quality" image. Images that are not "identification quality" may be too faint, blurry, coarse, small, etc., to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g. hair or eye color) of an individual.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

As used herein, the term "fixed data" refers at least to data which is identical for each ID card. Fixed data can, for example, be preprinted on an overlay patch, a laminate or an information-bearing layer of the ID card. Fixed data can also be printed on each individual ID card during the process of printing and optionally laminating the ID card. The term "variable data" refers generally to data which differs for each ID card and is associated with personal information, an image of the ID card holder or a unique reference number for security purposes assigned by the issuing agency.

As used herein, an "information-bearing layer" refers at least to the parts of an ID document where pictures, images, text, bar codes, fixed and/or variable data are printed. The information-bearing layer can include a separate receiver layer adapted to accept inks, dyes, pigments and resins from thermal print ribbons. The information-bearing layer can itself be the receiver layer. Depending on the particular design of the ID document, the information bearing layer can be the substrate or core layer, but also can be a laminate applied thereto, or to another laminate layer on the card. There can be different information bearing layers in an ID document for pre-printing and for personalization.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of potentially usable laminates include at least polyester, polycarbonate, polystyrene, cellulose ester, polyolefin, polysulfone, polyvinyl chloride (PVC), polyethylene, polypropylene, and polyamide. Laminates can be made using either an amorphous or biaxially oriented polymer as well. The laminate can comprise a plurality of separate laminate layers, for example a boundary layer and/or a film layer. Other possibly usable laminates include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy. Laminates can include synthetic resin-impregnated or coated base materials composed of successive layers of material, bonded together via heat, pressure, and/or adhesive.

The material(s) from which a laminate is made may be transparent, but need not be. The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1–20 mils. Lamination of any laminate layer(s) to any other layer of material (e.g:, a core layer) can be accomplished using any conventional lamination process, and such processes are well known to those skilled in the production of articles such as identification documents. Of course, the types and structures of the laminates described herein are provided only by way of example, those skilled in the art will appreciated that many different types of laminates are usable in accordance with the invention. Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. Patents is herein incorporated by reference.

For purposes of illustration, the following description will proceed with reference to ID document structures (such as TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways to provide information thereon that is not identifiable and generally not visible using visible light, but which is visible or identifiable when using a non-visible light, such as an ultraviolet (UV) light or an infrared (IR) light. In another aspect, the invention also has applicability to providing information on structures that fluoresce in a given spectrum (e.g., the UV or IR spectrum) upon excitation with visible light. Generally, the invention has applicability for virtually any product which is to be printed and especially those products which need to be uniquely identified and/or protected against fraud and/or tampering. For example, at least some embodiments of the invention are usable to form non visible indicia on articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

In addition, for purposes of illustration, the following detailed description is provided using ultraviolet (UV) information as an example of a type of information that is generally not visible using normal light but is visible using an appropriate light source (e.g., a UV light source). It should be understood that while some of our detailed embodiments described herein use UV dyes, inks, light source, ribbon panels, etc., by way of example, the present invention is not so limited. Our inventive techniques and methods can be used in connection with infrared and other fluorescing images as well. Accordingly, those skilled in the art will appreciate that each and every reference to UV inks, dyes, light sources, panels, on ribbons, etc., is equally applicable to other types of information that is generally not visible using normal light, such as infrared (IR) information, as well as to information printed using a blend of UV and IR fluorescing compounds. Moreover, one or more of our inventive techniques can be useful in the printing of images destined for ID documents using various printing processes including, but not limited to, dye infusion, mass-transfer, laser xerography, ink jet, wax transfer, variable dot transfer, and other printing methods by which a fluorescing image can be formed.

Further, it should be appreciated that although the some of the figures illustrate a particular species of ID document—a driver's license—the present invention is not so limited. Indeed our inventive methods and techniques apply generally to all identification documents defined above. Moreover, as noted herein, our invention is applicable to non-ID documents, e.g., such as printing or forming non-visible images on physical objects, holograms, etc., etc.

It is further anticipated that the invention could have applicability in manufacturing articles which are to have a feature formed thereon (especially a feature that is intended to have the appearance of an identifiable full color feature) that is not necessarily intended to be used as a security or identification feature, but which is at least intended to be non visible to a human eye in visible light, but visible using a non-visible light such as UV or IR, or which is intended to glow or fluoresce in a non-visible spectrum upon excitation with visible light. It is anticipated that the one or more embodiments of the invention can have applicability in industries such as aerospace, defense, the military, pharmaceuticals, consumer goods, medicine and medical devices, electronics, publishing, advertising, promotion, entertainment, the production of artwork, signage, decorative items, and novelty products.

Application of the Invention to ID Documents

In one aspect, the invention provides ID documents having full-color UV "identification quality" variable information printed thereon at the time the ID document is personalized. The variable UV information is not visible in normal (e.g., ambient) light, but is visible when viewed using a non-visible light source, such as a UV light source.

The inventors of the instant application have discovered at least one reason why, until now, it has been is difficult to obtain "identification quality" full color images UV images when printing variable data in UV on an ID document such as an ID card. Recall that humans see visible images when light is shined on them and the light reflecting back creates an image visible to a human eye—a net subtractive technology. When humans (using an appropriate light source) see UV (or IR) images, however, what the human eye sees is not a reflection, but rather an emission—humans see the light that is emitted because the compounds used to form the image fluoresce when viewed using the appropriate [UV or IR] light source.

When non-visible variable information is printed on ID documents that already have pre-printed information thereon, however, the reflections of the preprinted information can interfere with the light emitting from fluorescing dyes or pigments as they are activated by an appropriate light or energy source. This interference can result in diminished quality of the non-visible image. In addition, some of the emissions from the fluorescing dyes or pigments can be absorbed back into parts of the ID document, including back into dyes that might be on the ID document. The reflections from the pre-printed information do not always affect the ability to discern some types of information (such as characters and simple graphics) printed with non-visible inks/dyes, but the reflections can make an image such as a portrait virtually unusable as an "identification quality" image. We have found that to help achieve the best quality colored UV images, it is necessary during printing and selection of the printing ribbon to take into account the reflections of pre-printed information that still occur when UV information is viewed using a UV light source. We have found that the existence of these reflections can limit the physical locations on an ID document where one can form an "identification quality" UV image using D2T2 type printing. For printing UV using D2T2, we have found that it often is necessary to have a substantially "pristine" card area (an area where there are no reflections already present from other image) in which to print a D2T2 image.

Another problem associated with printing some types of non-visible images, such as UV images, is that since the non-visible image "glows" under appropriate UV stimulation, image details are less apparent, blurred or can be completely lost. The UV glowing essentially washes out an image's perceptible crispness (e.g., similar to a situation in which a dimly lighted object is in proximity to a brightly lighted object). The following commonly assigned pending provisional patent applications provide some methods for addressing this problem:

Image Processing Techniques for Printing Identification Cards and Documents (Application No. 60/371,335, Attorney Docket No. P0609—Inventors: Nelson Schneck and Charles Duggan, filed Apr. 9, 2002); and Image Processing Techniques for Printing Identification Cards and Document (Application number not yet assigned, Attorney Docket No. P0720D, filed Nov. 25, 2002—Inventors: Nelson Schneck and Chuck Duggan.

We have found that use of the techniques and methods recited in the above applications (which we explain at a high level below) can, in combination with the techniques described herein, improve the quality of variable information printed in full color UV. In at least some embodiments, the above-cited provisional applications provide ways to enhance image details to overcome the UV washout problem. In at least some embodiments, the above-cited provisional applications disclose ways to digitally process an image prior to printing to compensate for the glowing effect.

First Aspect of the Invention

Figure 3:
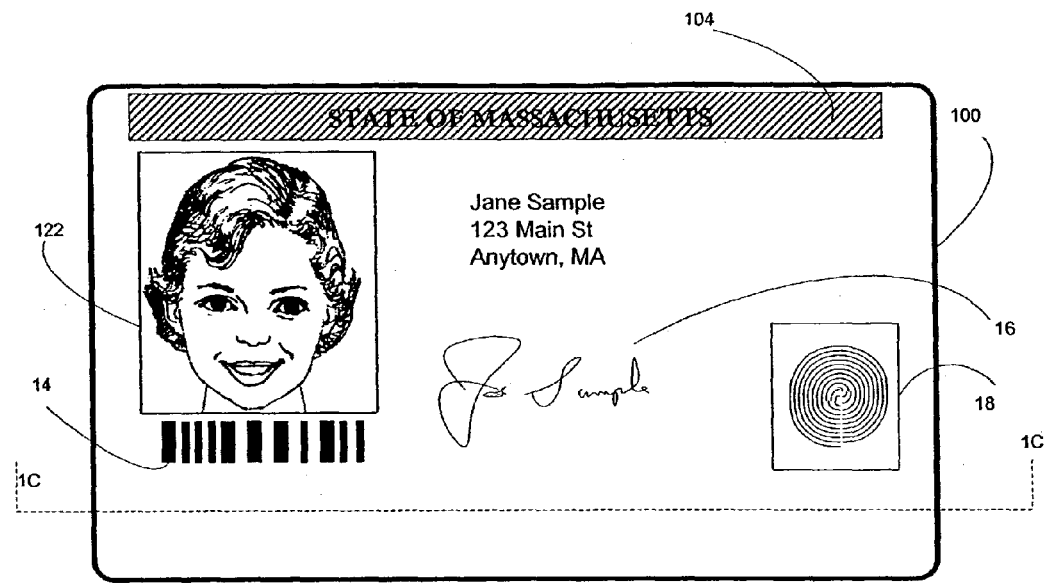
FIG. 3A is an illustrative example of a first ID document in accordance with a first embodiment of the invention, as viewed in ambient light.
FIG. 3B is an illustrative example of the first ID document of FIG. 3A viewed in ultraviolet light.
FIG. 3C is an illustrative example of a second ID document in accordance with a second embodiment of the invention, as viewed in ultraviolet light.
FIG. 3D is an illustrative example of a third ID document in accordance with a third embodiment of the invention, as viewed in ultraviolet light.
FIG. 3E is an illustrative example of a fourth ID document in accordance with a fourth embodiment of the invention, as viewed in ultraviolet light.
FIG. 3F is an illustrative example of a fifth ID document in accordance with a fifth embodiment of the invention, as viewed in both ultraviolet and infrared light
Figure 3:
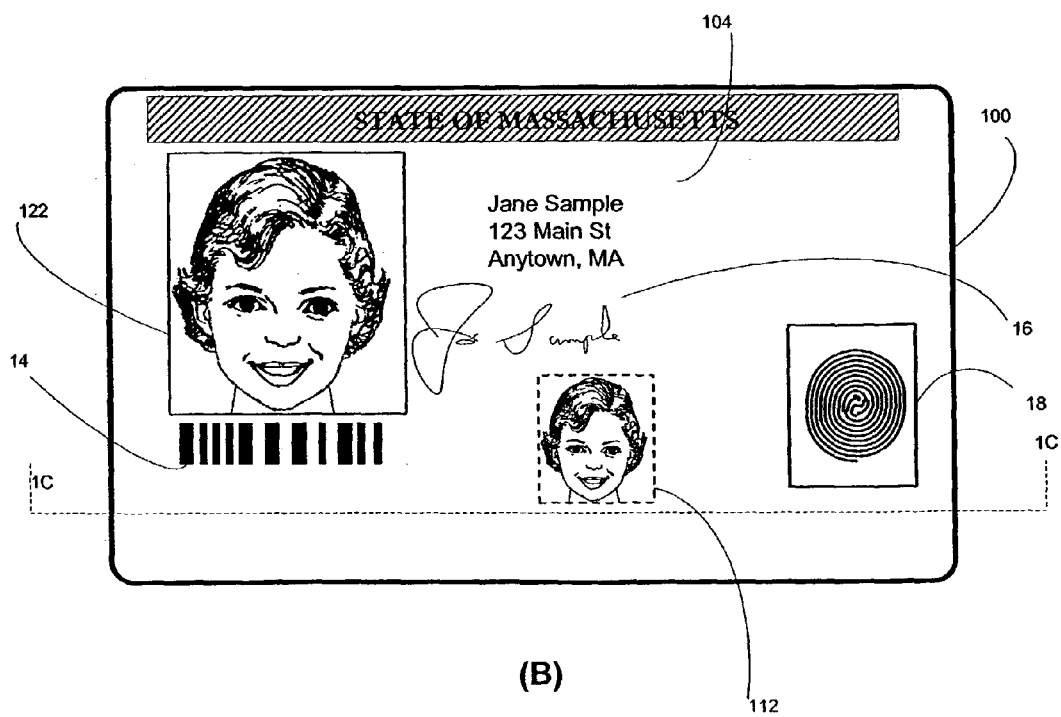
Figure 3:
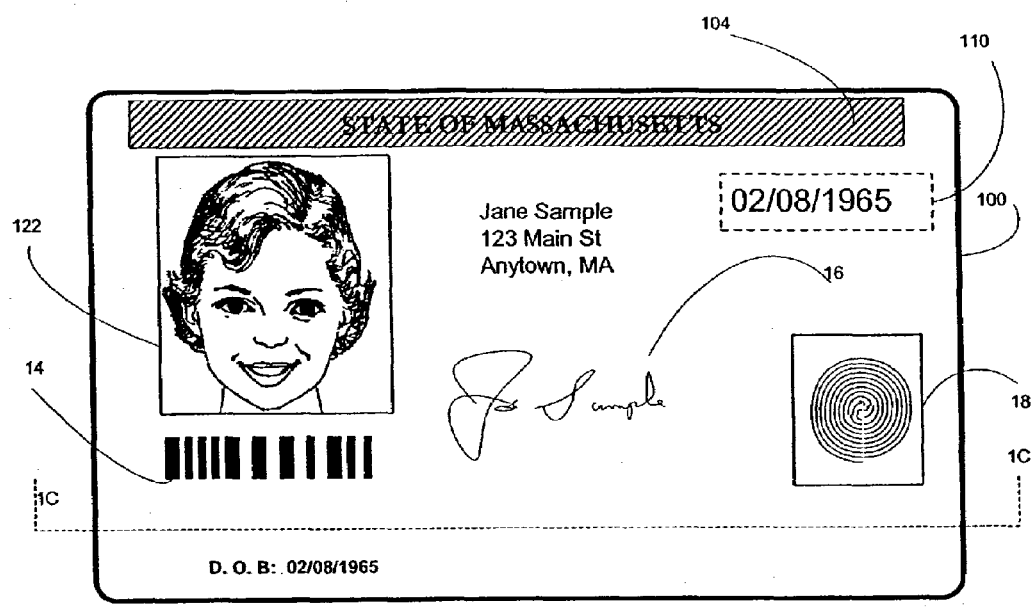
Figure 3:
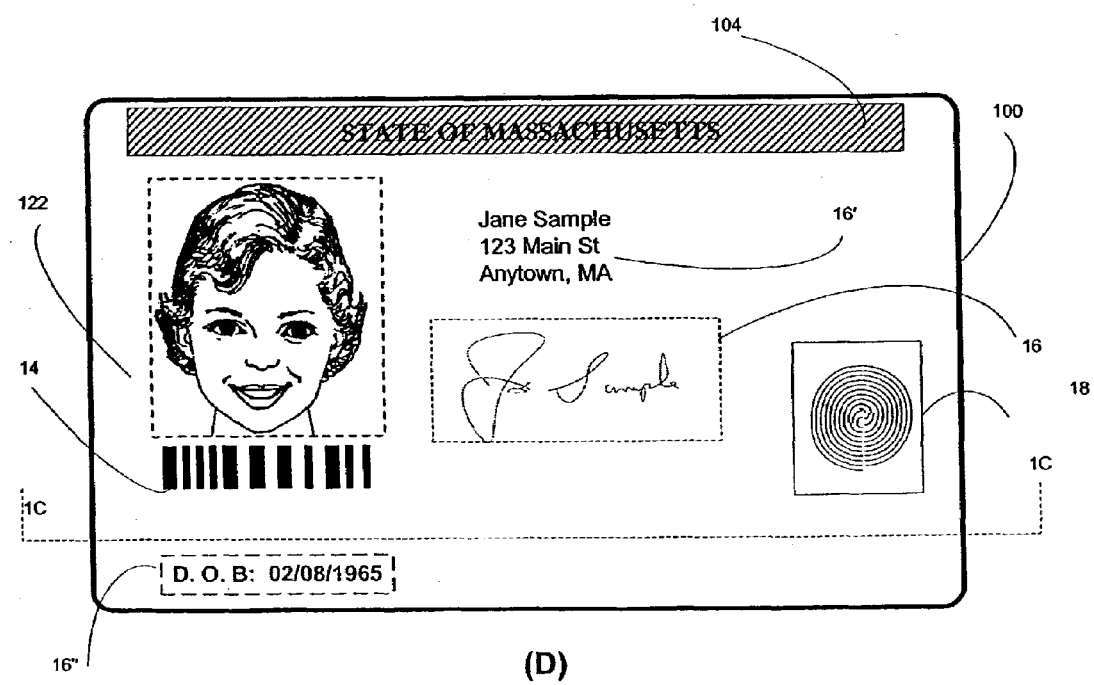
Figure 3:
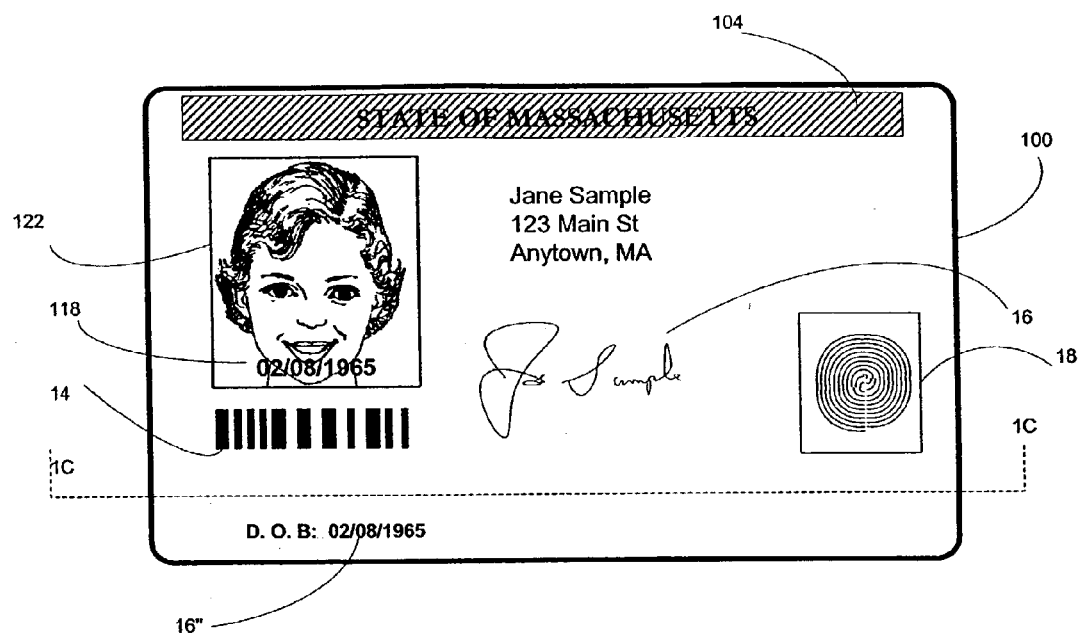
Figure 3:
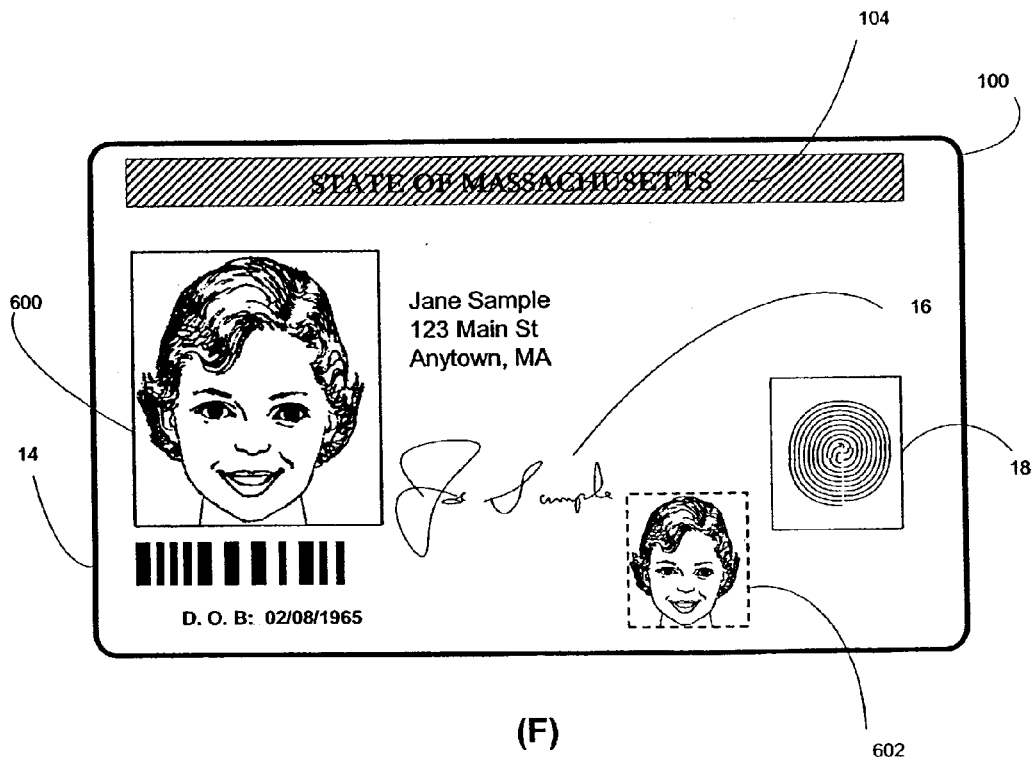

In a first aspect of the invention, we provide an ID document and method for making the ID document, where the ID document has thereon a discernable, identifying variable data image that is visible only under UV illumination. In one embodiment of the first aspect, this discernable identifying variable data image (which we call a "UV Ghost Image") is provided on the card in addition to a visible image (which can, for example, be the same image) printed on the card. For example, FIG. 3A is an illustrative example of a first ID document 100 in accordance with a first embodiment of the invention, as viewed in ambient light, and FIG. 3B is an illustrative example of the first ID document 100 of FIG. 3A viewed in ultraviolet (UV) light.

Referring to FIG. 3A, the ID document 100 includes a bar code 14, variable personal data 16, 16', 16", biometric information 18, preprinted nonvariable information 104, and a bearer image 122. FIG. 3B illustrates that when the ID document 100 is viewed in ultraviolet light, additional information becomes viewable (not that, for purposes of illustration only, in FIG. 3A the visible image 122 is shown as being "fainter" when viewed in UV light. An actual visible image might appear to be blue when viewed under UV light. In FIG. 3A, the additional information viewable only in UV light and a UV Ghost image 112.

Note that although the UV Ghost image 112 is shown as being smaller in size and in a different place than the visible bearer image 122, the invention is not limited to this implementation. It at least one embodiment, for example, the location of the UV Ghost image 112 can coincide with the respective location of the corresponding visible information (in which case, the appearance of the ID document 100 under UV light could look very similar to the way it looks in visible light in FIG.3A). In one embodiment of the first aspect, the UV Ghost image is the only image of its kind on the card (that is, the UV Ghost is not a duplicate of other information on the card).

In FIG. 3B, the UV ghost image 112 can be a UV image that comprises one or several UV fluorescing colors. In one advantageous embodiment, the UV ghost image 112 is a so-called "false two color image" made of two UV fluorescing colors (i.e., any two of yellow, magenta, and cyan) and is located in a different space on the ID document than the corresponding visible image 122. In one preferred embodiment, the false two color image is made of yellow and magenta, which we have found produces an image adequate for identification.

Figure 4:
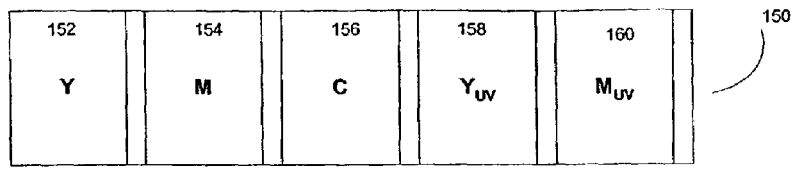
FIG. 4 is an illustrative example of a first ribbon, in accordance with a fifth embodiment of the invention.

In one implementation of this embodiment, the UV ghost image 112 is formed with a dye panel that contains a UV fluorescing dye. The UV dye panel is used as an additional panel to the CMY panels in a conventional D2T2 ribbon. For example, FIG. 4 is an illustrative example of a first YMC ribbon 150 that we have developed that can be used to make an ID document with a UV ghost image 112, in accordance with one embodiment of the invention. The YMC ribbon 150 comprises a plurality of color panels, including a yellow color panel 152, a magenta color panel 154, a cyan color panel 156, a yellow UV color panel 158, and a magenta UV color panel 160 (two UV panels, and the particular two UV colors selected, are not limiting). Each color panel 152–160 can be coated with a colorant such as a diffuseable dye in a resin. The yellow UV color panel 158 and the magenta UV color panel 160 each comprise a heat diffuseable UV fluorescing dye. Such dyes are known to those skilled in the art. UV images printed using the yellow UV panel 158 and the magenta UV panel 160 will be so-called "false two color" UV images.

In accordance with this embodiment of the invention, the UV ghost image 112 of FIG. 3B can be printed on the ID document 100 at the same time that the visible image 122 is printed, using the yellow UV panel 158 and the magenta UV panel 160. We have found that using the two UV dyes, as illustrated in FIG. 4, helps to minimize the absorption problems (i.e., emission losses) that can occur when printing variable UV images on top of (or near) visible information. Of course, other pairings of UV colors (e. g., yellow and cyan, magenta and cyan) are usable in at least some embodiments of the invention, although we have found that pairings that at least incorporate yellow provide the best quality images.

In one embodiment, another technique that we have found to compensate for the UV emission absorption problem is to use a detector device when viewing the information under UV light. The detector is used to amplify the received light signals to compensate for the emission absorption problem, and can recreate information in one, two, or three colors based on UV information that it detects. A detector usable in this embodiment can be obtained from Assuretec Systems, Inc. of Manchester, N.H.

Figure 5:
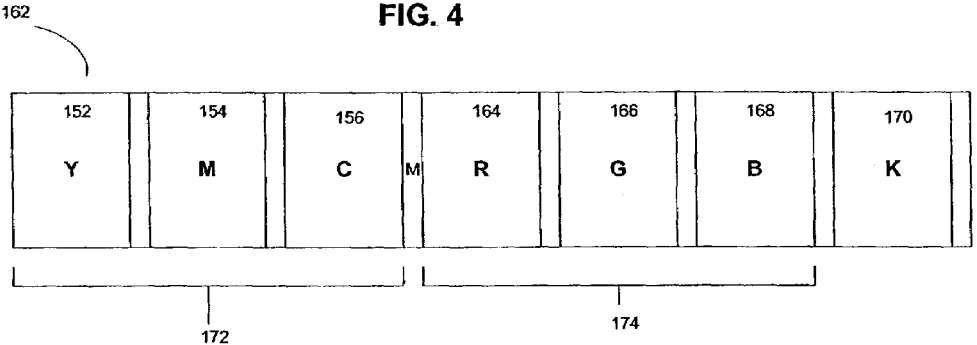
FIG. 5 is an illustrative example of a second ribbon in accordance with a sixth embodiment of the invention.

In another embodiment, the UV ghost image 116 can be printed as a three color image with a specialized ribbon. FIG. 5 is an illustrative example of a three color UV ribbon 162 that we have developed in accordance with one embodiment of the invention. The three color UV ribbon 162 includes a yellow color panel 152, a magenta color panel 154, a cyan color panel 156, a red UV panel, 164, a green UV panel 166, a blue UV panel 168, and a black (K) text panel 170. The yellow color panel 152, magenta color panel 154, and cyan color panel 156 together form a visible color set 172 used to print a visible color image (e.g., the visible bearer image 122 in FIG. 3A). The red UV panel, 164, green UV panel 166, and blue UV panel together form a UV color set used to print the UV ghost image 1120. The K panel 170 is used to print text, such as the variable personal data 16 of FIG. 3.

Image Processing Techniques for Printing Variable UV Information on Identification Documents In still another embodiment of the first aspect, to help create a discernable fluorescing image on an ID document (useful for identification and security checks) we have found that we can enhance the digital data that is used to create the UV image. Enhancing the digital data as described herein can help to overcome possible "washout" problems that can occur when a UV image is fluoresced. These enhancements (which are also detailed in the following commonly assigned pending provisional patent applications) provide some methods for addressing the UV washout:

Image Processing Techniques for Printing Identification Cards and Documents (Application No. 60/371,335, Attorney Docket No. P0609—Inventors: Nelson Schneck and Charles Duggan, filed Apr. 9, 2002); and Image Processing Techniques for Printing Identification Cards and Document (Application number not yet assigned, Attorney Docket No. P0720D, filed Nov. 25, 2002—Inventors: Nelson Schneck and Chuck Duggan.

These digital enhancements, in combination with the other embodiments of the invention described herein, help to achieve "identification quality" variable UV image printing onto identification documents.

Digital Enhancements for UV Images.

We have found that different image processing techniques are preferred used to preprocess an original image depending on whether the tonality of image reproduction (e.g., printing process) is bitonal (e.g., two tones such as black and white or a first color and second color) or monochromatic (e.g., shaded image, grayscale, etc.). (We also note that other optional factors to consider include the viewing methods used with the image, such as reflectance, transmissive characteristics (e.g., as discussed above with the UV glowing) and tactility.

For the methods discussed below, we assume that an image has been digitally captured, e.g., via a digital camera, optical sensor, etc., or through scanning a photograph with a scanner, etc. This captured image can be reprinted on the identification document as visible bearer image 122 in FIG. 3A. Our inventive methods refine this captured image to produce an intermediate image, which can be transferred or printed (or used to generate an image to be transferred or printed) to the identification document as, for example, UV ghost image 112 of FIG. 3B.

Mass Transfer Images

Our first inventive method is particularly well suited for producing bitonal images (e.g., black and white images), such as produced through mass-transfer thermal printing and Laser Xerography. Generally, we process a captured image to bring-out or otherwise enhance relevant features found in the captured image. Relevant features of a human face may include the face outline, nose and mouth pattern, ear outline, eye shape, hairline and shape, etc. Once identified, these featured can be "thickened" or otherwise emphasized. The emphasized features can then form a digital version of UV ghost image 112, which can be transferred to an identification document.

The following discussion proceeds with reference to the accompanying flow diagrams and images (FIGS. 14*a*–14*g*) that variously correspond to our inventive steps.

Figure 11:
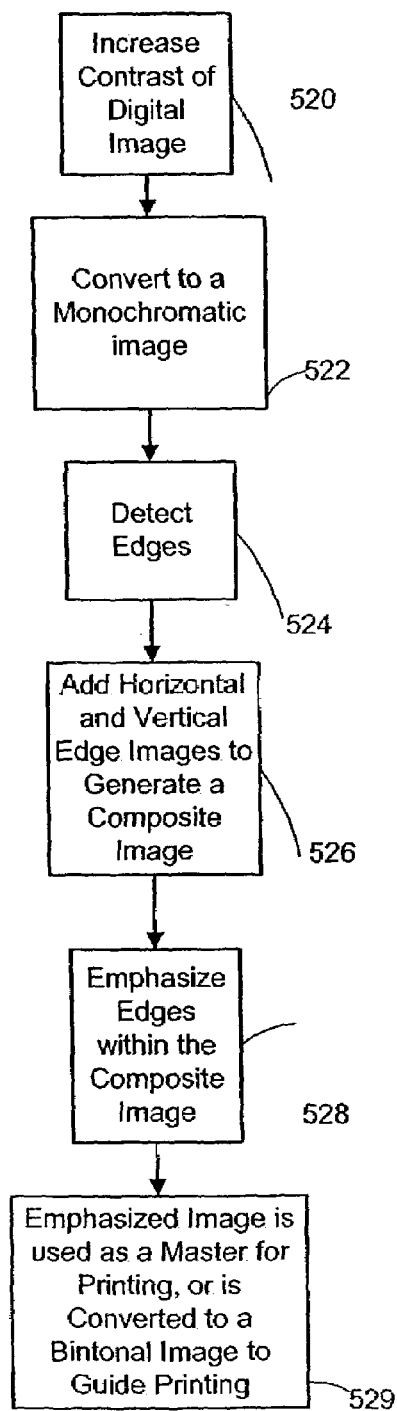
FIG. 11 is a flow diagram outlining one aspect of the present invention.
Figure 14A:
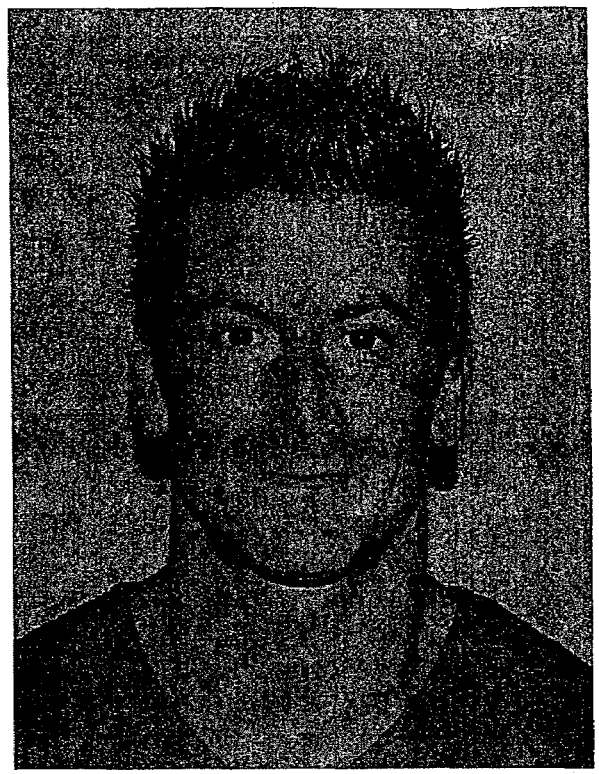
FIGS. 14a–14g are images illustrating an inventive aspect of the present invention, and in particular.
Figure 14B:
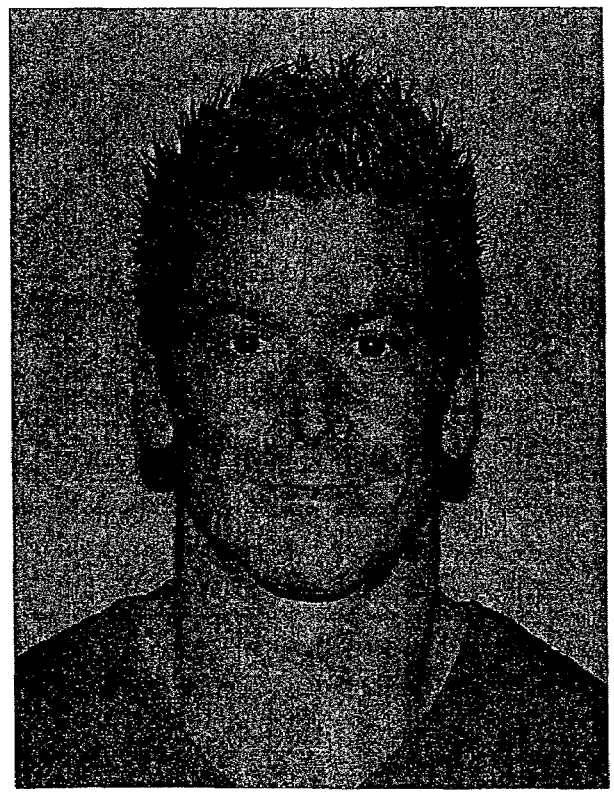
Figure 14C:
Figure 14D:
Figure 14:
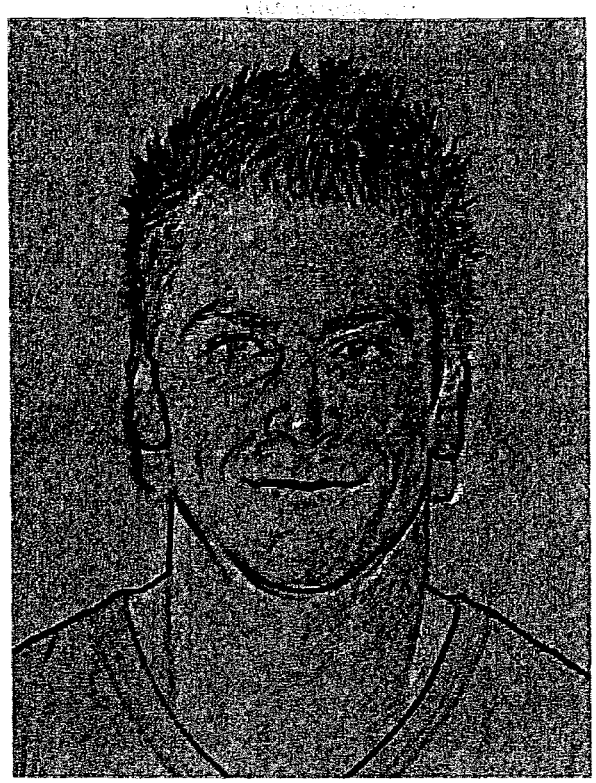
Figure 14:
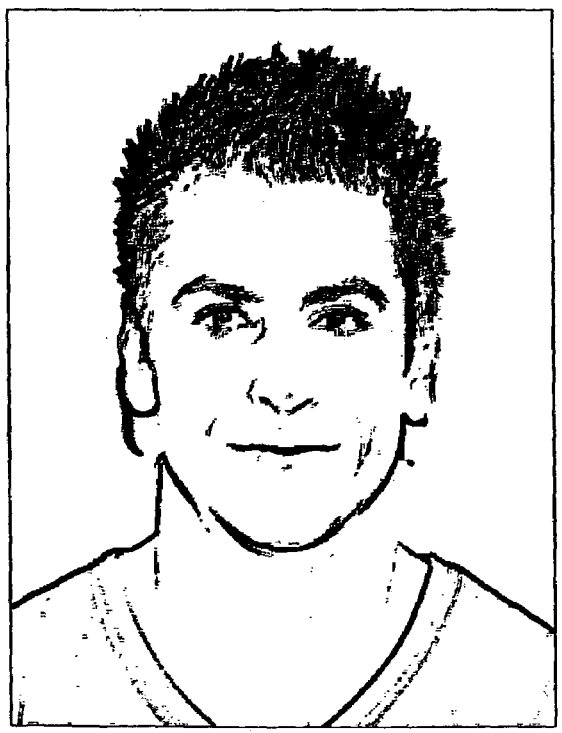
Figure 14G:
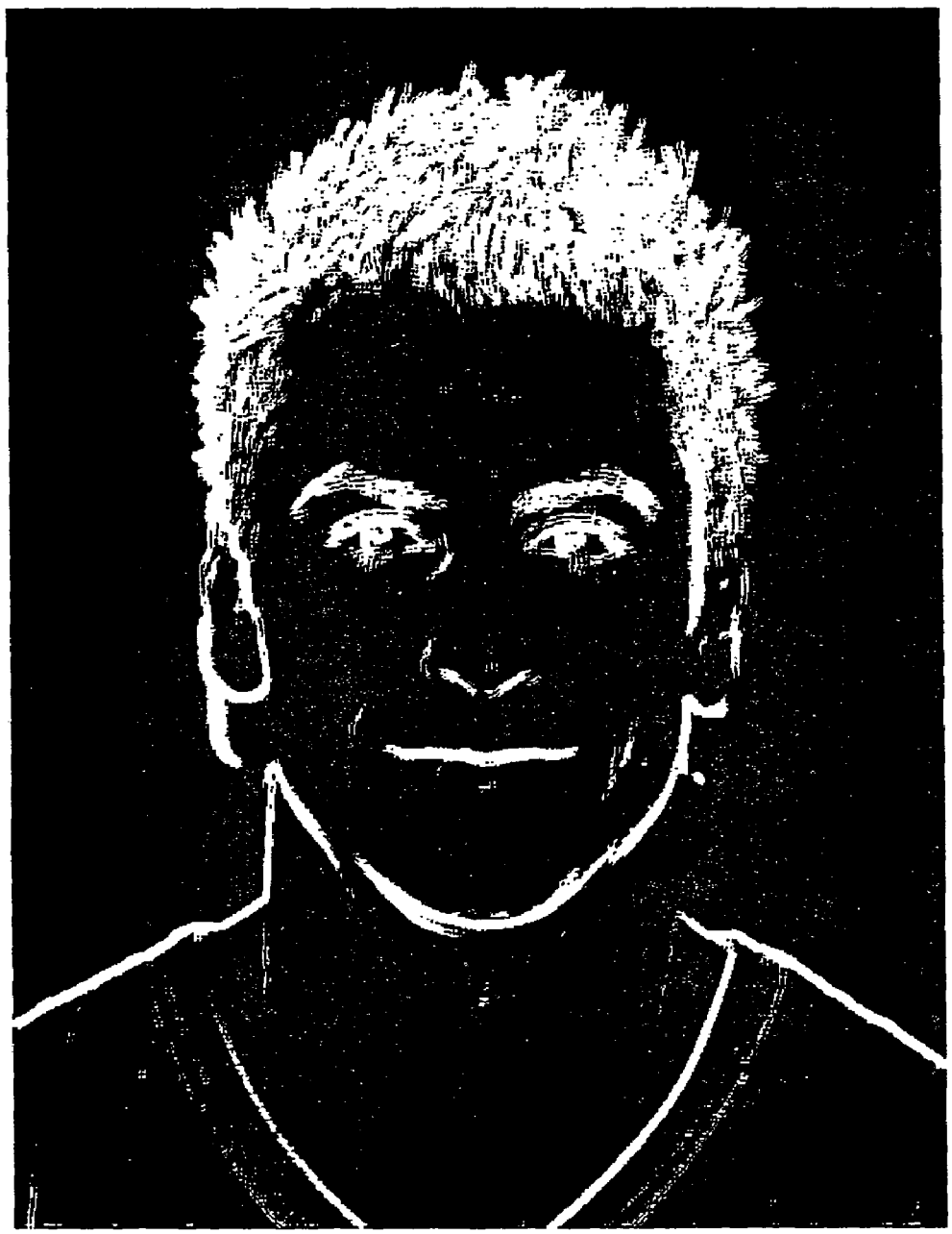

Now, consider a specific implementation with reference to FIG. 11. We initially improve the contrast in a captured image (step 520). FIG. 14*a* illustrates such a captured image—a headshot corresponding to a human subject— while FIG. 14*b* corresponds to a contrast improved version of FIG. 14*b*. While FIGS. 14*a* and 14*b* are color images, the present invention is not limited to such. Indeed, our inventive techniques apply to black and white images as well. FIG. 14*a* preferably corresponds to visible bearer image 122 in FIG. 3A (note that, for purposes of illustration, the actual image in FIGS. 14*a*–*g* are not literally the image of the same individual as shown in FIG. 3A; the applicable principles of the invention are, however, the same). For example, step 520 is intended to make dark pixels relatively darker and light pixels relatively lighter so as to increase the contrast of the image. Although not required, step 520 improves the performance of subsequent steps, such as the edge detection step 524. In some implementations, we then optionally convert the contrast-improved image (FIG. 14*b*) to a monochromatic image, e.g., a gray-scale image (step 522).

We analyze the contrast-enhanced image to identify or detect edges and/or boundaries within the image in step 524. As noted, eyes, nose and mouth often include prominent edges. Our preferred edge detection algorithm is the Sobel algorithm, however, we note that many other conventional algorithms such as other gradient-based edge detection algorithms (e.g., Roberts, Prewitt), Laplacian (e.g., Morrs-Hildreth) and the Canny edge algorithm can be suitably interchanged with this aspect of the present invention. The results of an edge detector produce an outline-like image, which highlights the edges (or maybe just the significant edges) of the monochromatic image. If using a Sobel algorithm, or another algorithm that produces multiple planes, a horizontal edge plane (FIG. 14*c*) and a vertical edge plane (FIG. 14*d*) are produced. These horizontal and vertical planes (or sub-images) can be combined to produce a composite image as in step 526. Of course this step can be skipped if the edge algorithm provides a composite horizontal and vertical edge image, instead of separate horizontal and vertical sub-images.

The composite image is then smeared, thickened or otherwise emphasized in step 528 (FIG. 14*e*). For example, we can "grow" the edges by a predetermined factor (e.g., 1½–2 times the original edge or line thickness). Or we can use an iterative pasting of each sub-image or image plane, multiple times onto a final composite image, but each time offsetting the sub-image by a few pixels (e.g., in a range of 2–5 pixels). Or once a composite image is formed, the composite image can be repeatedly copied onto itself, but offset in different directions (toward image corners, or along an X-Y axis, etc.).

In some implementations, this thickened image (FIG. 14*e*) serves as the master (or negative) for guiding printing of UV ghost image 112 (FIG. 3B). In other implementations the thickened image is binaryized or converted to a bitonal image (FIG. 14*f*) to guide the printing of UF ghost image 112 (step 529). In some implementations, the thickened image or biotonal image is first inverted (FIG. 14*g*), and the inverted image guides the printing of UV ghost image 112. (So unlike UV ghost image 112 as presently shown in FIG. 3B, FIG. 14*g* would be printed as the UV ghost image 112.).

We have found that our method significantly reduce the washing-out of image details experienced in conventional UV images (when fluorescing).

An alternative implementation is discussed with reference to FIG. 12. We improve the contrast in a captured image (step 520). Here again, FIG. 14*a* illustrates such a captured image—a headshot corresponding to a human subject— while FIG. 14*b* corresponds to a contrast improved version of FIG. 14A. As previously noted, step 520 emphasizes the contrast of an image, e.g., by making dark pixels relatively darker and light pixels relatively lighter. Our contrast-enhancing step 520 improves the performance of subsequent steps, such as the edge detection step 524.

We analyze the contrast-enhanced image to identify or detect edges and/or boundaries within the image in step 524. As noted, eyes, nose, hair details and mouth often include prominent edges. The results of an edge detector produce an outline-like image, which highlights the edges (or in some implementations just significant edges) of the contrast-enhanced image. If using a Sobel algorithm, or another algorithm that produces multiple planes, a horizontal edge plane (FIG. 14*c*) and a vertical edge plane (FIG. 14*d*) are produced. The results of the edge detection are provided to form a composite image (e.g., step 536; FIG. 14*e*).

The composite image is used to guide printing. In some implementations we convert the composite image into a binaryized or bitonal image (e.g., FIG. 14*f*). We can also invert a binaryized or bitonal image (e.g., resulting in FIG. 14*g*) to guide printing.

Figure 12:
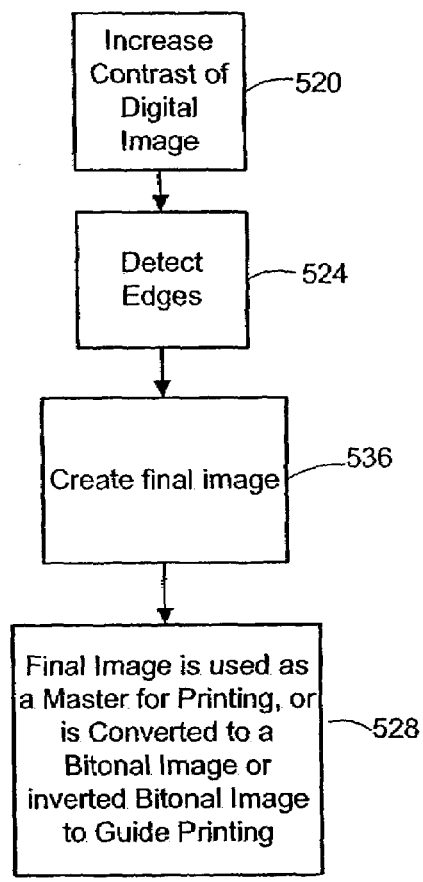
FIG. 12 is a flow diagram outlining another aspect of the present invention.

Our FIG. 12 method also reduces the washing-out of image details experienced in conventional UV images (e.g., when fluorescing).

Monochromatic

Figure 13:
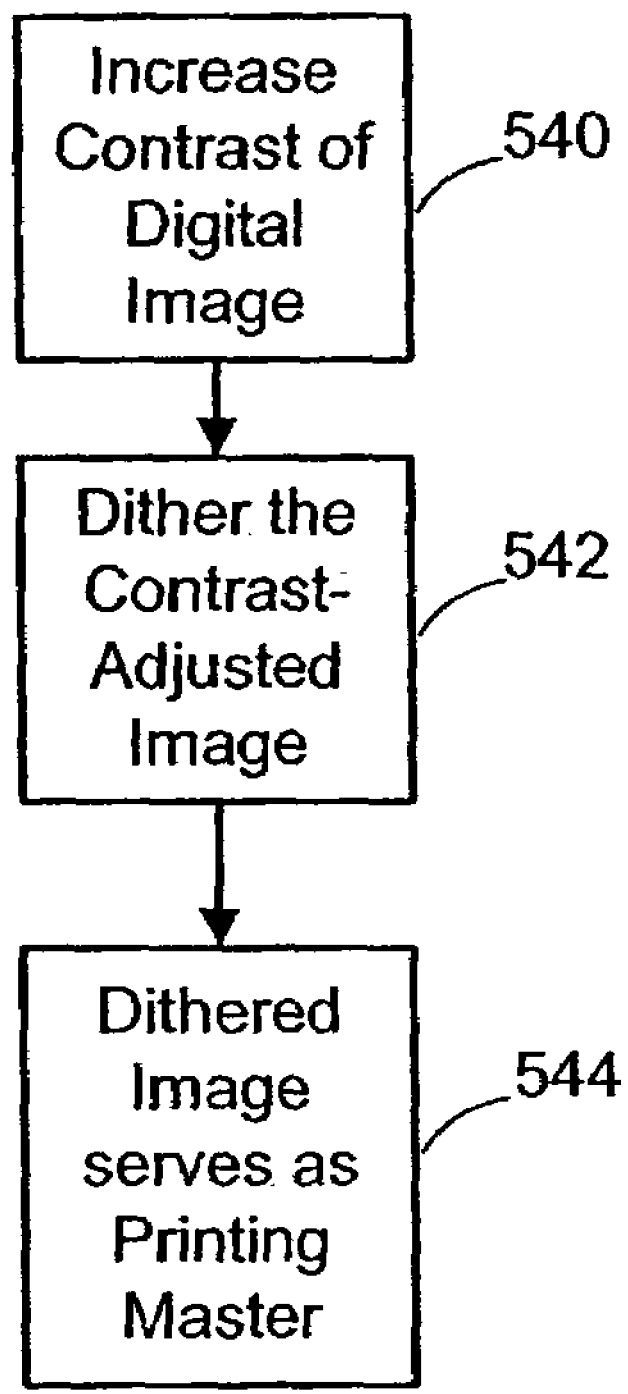
FIG. 13 is a flow diagram outlining yet another aspect of the present invention.

With reference to FIG. 13, a method for enhancing UV images formed through, e.g., D2T2, is described. An originally captured image is processed to increase the contrast in the captured image or in selected areas of the original image (step 540). (In one implementation, we use an edge-detection algorithm to identify selected areas (e.g., eyes, nose, mouth, face shape, etc.) in the original image, and the contrast in-only these selected areas is increased.). We note that care should be taken when using image-adaptive software to avoid removing pixel-intensity information that contributes to the quality of a final image. Dithering (e.g., the Floyd-Stein dithering method or other conventional dithering methods) of the contrast-adjusted image is employed to produce a print-ready image (step 542). The dithering helps to minimize the effects of UV washout. The dithered image is used as a master for printing a corresponding UV image (step 544). In some cases we invert the dithered image, and then guide printing with the dithered image. As an optional step (not shown in FIG. 134), we scale the contrast-adjusted image to a size that it will be printed, prior to step 542.

Second Aspect of the Invention

In a second aspect of the invention, we provide an ID document and method for making the ID document, where the ID document 100 that is provided that includes variable data (e.g., text, personal information, biometric data, etc.) that is imperceptible to the naked human eye. When illuminated with UV (or IR) light, however, the variable data or security features become readily visible. For example, with reference to FIG. 3C, ID document 100 includes variable UV character data 110 (which is shown by way of example only to be a birthdate) that is only visible upon UV illumination by UV light source (not shown). In one embodiment, The UV text is visible as (e.g., comprises) a single color, when viewed using a UV light source. In one embodiment, the UV text is visible as comprising two or more colors. For example, for the illustrative variable data/character string "12345", each character in the string can be printed to emit (under UV) as a different color and/or a different combination of colors, in accordance with one embodiment of the invention. Thus, for example, when viewed under a UV light, the "1" can be printed to emit yellow when, the "2" can be printed to emit pink, the "3" can be printed to emit orange, purple, brown, and blue simultaneously (e.g. different parts of the character itself will emit different colors), the "4" can be printed to emit in a "rainbow" or "pearlescent" appearance of many colors, the "5" can be printed to show optically varying colors under UV depending on the angle at which the character is viewed,. etc. As those skilled in the art will appreciate, the color combinations and permutations for coloring characters and strings of characters are. limitless.

Figure 6:
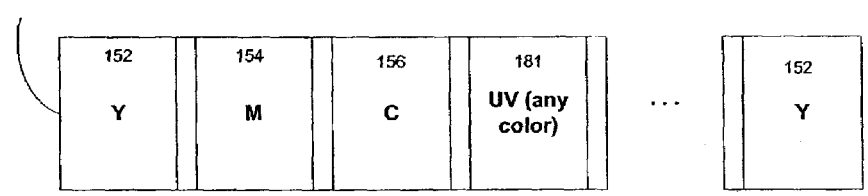
FIG. 6 is an illustrative example of a third ribbon in accordance with a seventh embodiment of the invention.

In one implementation of this aspect, at least one character and/or bar code based variable data (e.g., name, date of birth, address, tracking number, sequence number, and the like) that is printed in visible text on an ID document also is printed on the ID document in UV inks, such as by a specific panel on a D2T2 ribbon. In one embodiment, the specific panel on the D2T2 ribbon is a "resin transfer" panel, (not unlike the a K panel that is conventionally used for visible text and bar codes), where the resin transfer panel further comprises UV fluorescing dyes or pigments, the desired color(s) for printing UV characters. FIG. 6 is an illustrative example of a D2T2 UV resin transfer ribbon 172 that we have developed and which is usable to make the ID document 100 of FIG. 3C. The resin transfer ribbon 172 comprises yellow, magenta, and cyan panels 152, 154, 156, respectively, and a UV resin transfer pane 181.

In at least one embodiment of this aspect, after the UV text is applied to the ID document substrate using the D2T2 UV resin transfer ribbon 172, a laminate (such as a polyethylene terephthalate (PET)) based laminate) can be applied over the UV text. Application of this laminate can cause the UV text to fracture (split apart) upon an intrusion (e.g., counterfeiter or forger) attempt. The laminate is selected such that its adhesive strength is greater than its cohesive strength, whereby the laminate splits apart during attempted intrusions. As those skilled in the art will appreciate, the application of the laminate over the UV text can be controlled and adapted so that as the laminate splits, at least part of the UV text remains in one portion of the laminate and at least part of the UV text is on the other split portion of the laminate.

Although the variable UV character data 10 is shown in FIG. 3C in a different location than the corresponding visible variable information 16", the invention is not limited to this implementation. Furthermore, in at least one embodiment, using a mass transfer ribbon as described herein, the variable UV character data 110 can be printed directly over other variable [non UV] information on the ID document 100. For example, In FIG. 3E (which shows an ID document 100 being illuminated by a UV light source), the UV character data 110 overlays the visible bearer image 122.

Third Aspect of the Invention

In a third aspect of the invention, we provide an ID document and method for making the ID document, where the ID document has thereon a discernable, identifying variable data image that "glows" when illuminated by UV light. In one embodiment of the first aspect, this discernable identifying variable data image is provided on the card in addition to a visible image (which can, for example, be the same image) printed on the card. For example, FIG. 3C is an illustrative example of an ID document 110 as viewed under UV light, where at least some of the variable data on the card UV light "glows" under UV light. In FIG. 3C, the visible bearer image 122 is "glowing", as are some of the variable personal data 16, including the birth date 16" and the signature 16 (it should be understood that the ability to illustrate the "glowing" UV feature is limited, so if a given item is indicated as being only visible under UV light or "glowing" it should be viewed as so). Although not illustrated in FIG. 3C, the "glowing image" also could be another feature on the card, such as a security indicia, a code, a state seal, a digital watermark, etc., that is only visible under UV illumination.

Figure 7:
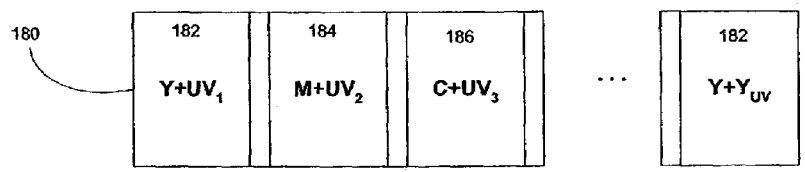
FIG. 7 is an illustrative example of a fourth ribbon in accordance with an eighth embodiment of the invention.

In one implementation of this aspect, variable data is D2T2 printed with a special ribbon that contains the usual visible Cyan (C), Magenta (M) and Yellow (Y) panels, but where at least one of the visible panels also contains a corresponding a heat diffuseable UV fluorescing dye. The heat diffuseable UV fluorescing dye can be the same color as the visible panel that is diffused into the ID document substantially simultaneously with the visible panel, but it need not be the same color. In fact in at least one embodiment, it is preferred that the color of the heat diffuseable UV fluorescing dye be different than the color of the panel, to enable the color of the UV to be viewed more clearly under UV light. FIG. 7 is an illustrative example of a UV glowing ribbon 180 that can be used to print the "glowing" variable data in FIG. 3C. Each color panel 182, 184, 186 in the UV glowing ribbon 180 that we have developed that includes a corresponding diffuseable UV fluorescing dye. The UV dye is diffused into the ID document substrate along with the Y dye. (In at least one implementation of this embodiment, the UV dye is heat diffusible.). Note that the UV dye in each color panel 182, 184, 186 need not fluoresce in the same color as the color of the visible panel.

In this implementation, the UV image that glows in necessarily coincides exactly with the corresponding visible image (as can be seen in FIG. 3C). Although the glowing ribbon 180 shows that all three color panels 182, 184, 186 have a UV component (to provide a "full color" glowing UV image), it will be appreciated that the glowing ribbon 180 also could be provided with just a single one of the color panels having a UV component, whereby the variable data printed using such a glowing ribbon 180 would fluoresce in a single color.

Of course, instead of D2T2, other printing techniques can be used so long as UV dyes or inks are transferred to the substrate, to represent a particular color. Additional UV panels can be added to achieve additional ghost image colors. In other implementations of the invention, the UV component can be mixed with process colors CM or Y, and applied using conventional printing techniques.

This aspect of the invention also can provide forensic advantages. Because the design of the UV glowing ribbon 180 links the dye that makes the visible image to the dye that makes the fluorescent image, it can be extremely difficult to duplicate a pair of visible-UV dyes on and ID document. Thus, the use of a fraudulent dye for either the UV or the color or both can help to serve as a "fingerprint" in detecting the origin and type of fraud.

Fourth Aspect of the Invention

Figure 8:
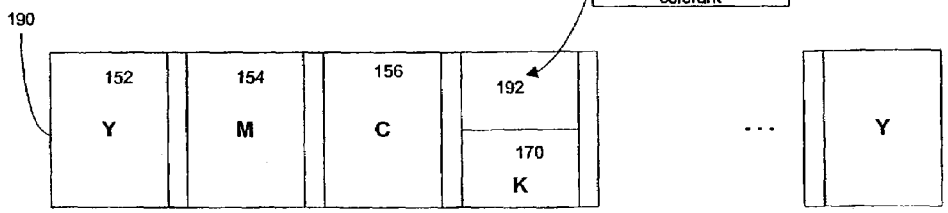
FIG. 8 is an illustrative example of a fifth ribbon in accordance with a ninth embodiment of the invention.

It generally has been difficult to have information such as black text and/or black bar codes be able to be printed with UV colorant (dyes/inks) such that the black text/bar codes can glow, because the black text/bar codes tend to absorb much of the emitted light. To help overcome at least some of this problem, in a fourth aspect of the invention, we provide an ID document and method for making the ID document, where at least some of the variable black text on the document glows in one or more of a number of available colors under UV illumination. In one embodiment, the black text is printed by a conventional K (black) panel, such as a resin transfer panel with carbon black for optical density. The ribbon containing the K panel, however, is constructed to include an optically clear layer containing an UV fluorescing dye or pigment. FIG. 8 provides an illustrative example of a UV on black ribbon 190 that we have developed, in accordance with one embodiment of the invention. The UV on black ribbon 190 comprises yellow, cyan, and magenta panels 152, 154, 156, a K panel 170, and (disposed underneath the K panel ), an optically clear panel 192 that contains UV colorants, such as inks or dyes, disposed in a resin. The optically clear panel 192 can, for example, be placed underneath the K panel 170 and above the release layer on a carrier web that typically is included as part of the ribbon.

Figure 16:
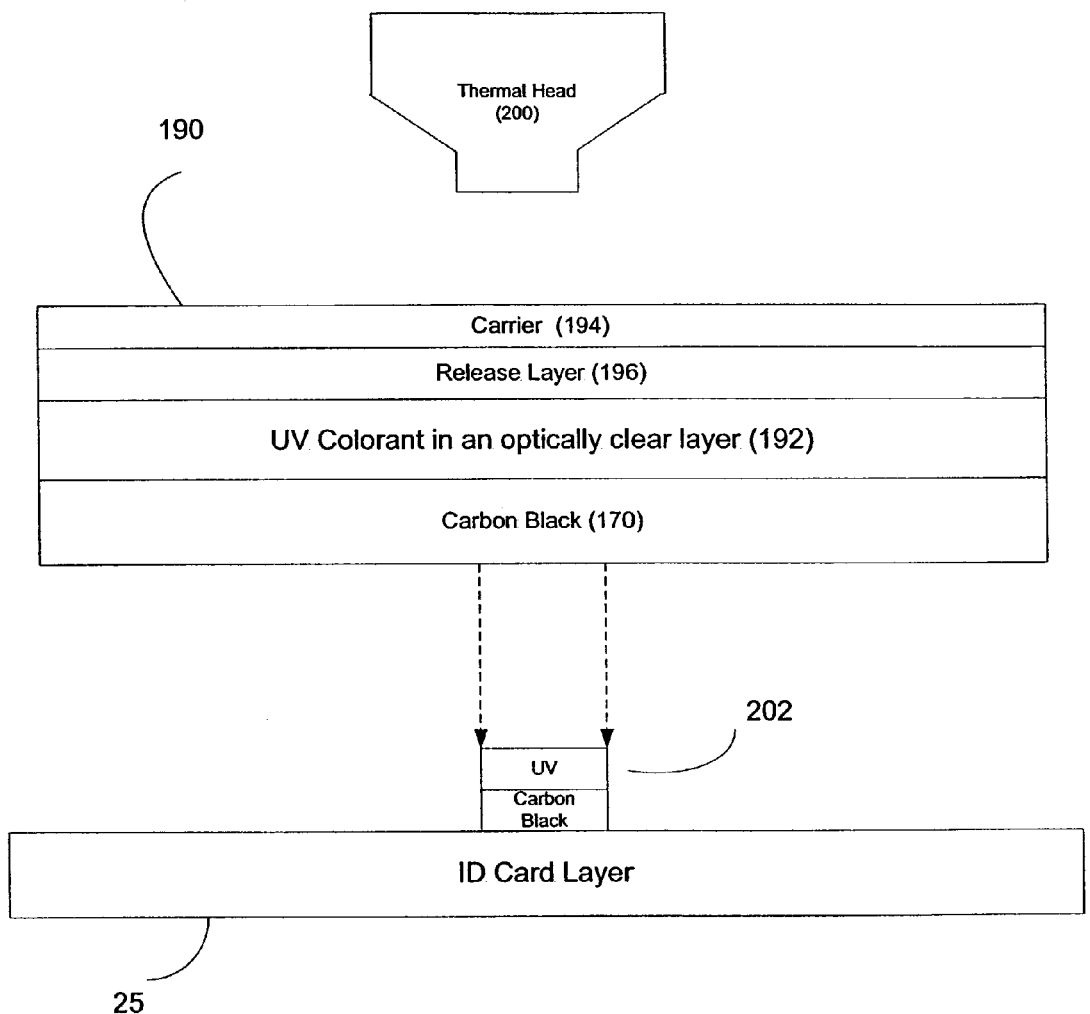
FIG. 16 is an illustrative example of a transfer carrier for printing UV on black, in accordance with one embodiment of the invention.

A cross sectional view of the UV on black ribbon 190 is illustrated in FIG. 16, which also illustrates how pixels of UV on black are deposited on a substrate, such as an ID card 25. Referring now to FIG. 16, the thermal print head 200 comes down to the UV on black ribbon 190 and, through its normal action, a pixel 202 comprising UV and black is "stamped out" of the UV on black ribbon 190 and deposited on the surface of the ID card 25. The pixel 25 is seen as black under visible light but fluoresces in a selected color (corresponding to the UV colorant in the optically clear layer 192) under illumination in UV light.

In at least one embodiment, the UV resin in the optically clear layer and the resin in the carbon black layer 170 of the UV on black ribbon 190 are compatible (i.e., miscible in all proportions). Compatibility between the resin in both the clear layer and the resin in the carbon black layer can help ensure intimate bonding upon a coating operation. One way to ensure that the UV resin and the carbon black resin are compatible is to prepare each resin using the same resin binder (e.g., polyvinyl chloride (PVC), acrylate, urethane, etc., and the same solvents (e.g. polyvinyl buterol, methyl ethyl ketone, toluene, toluol, etc.). Selection of the appropriate solvents and resins to work with UV and carbon black is, of course, within the skills of those familiar with the art.

Fifth Aspect of the Invention

Figure 9:
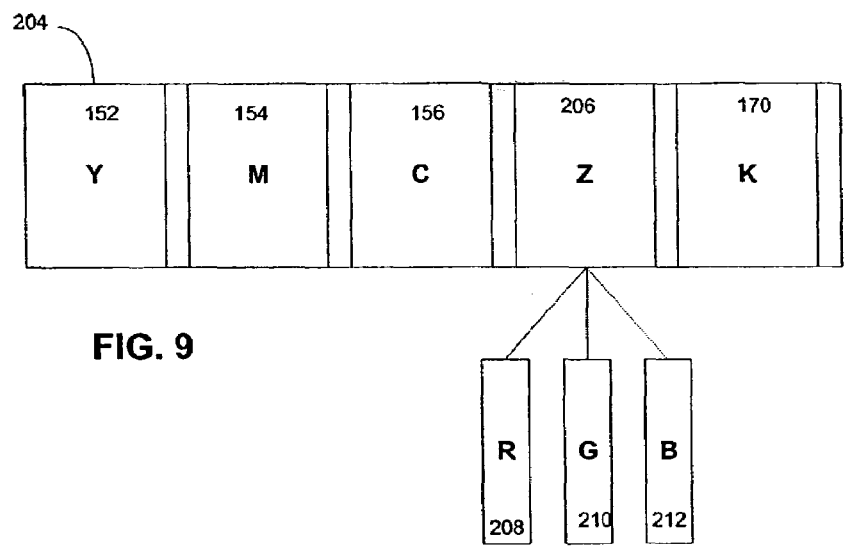
FIG. 9 is an illustrative example of a sixth ribbon in accordance with a tenth embodiment of the invention.
Figure 10:
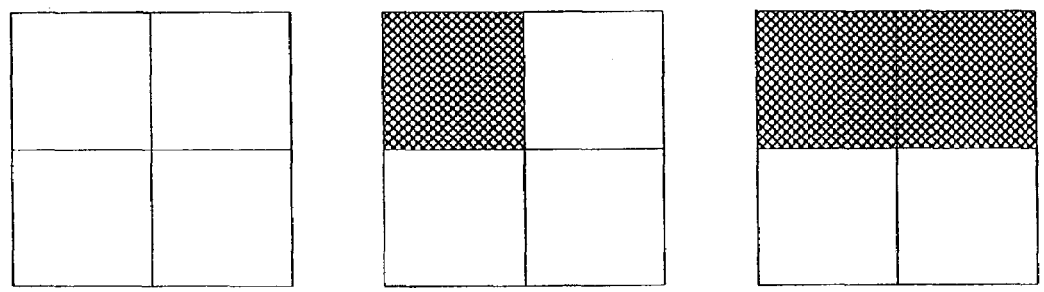
FIGS. 10A–E are illustrative examples of megapixel densities used with at least one embodiment of the invention.
Figure 10:
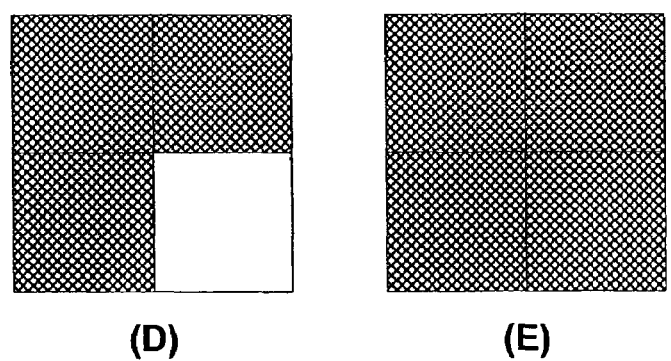

In a fifth aspect of the invention, we provide an ID document and method for making the ID document, where the ID document has a full color UV variable image formed thereon and the full color variable UV image is printed on the ID document using a thermal transfer method. The appearance of the resultant full color UV image in this aspect can be similar to that of the full color UV images discussed in connection with the first aspect of the invention; further, all of the special digital processing of the image discussed in connection with the first aspect is similarly applicable here. However, this fifth aspect of the invention differs from the first aspect in that in this fifth aspect prints the full color UV image via thermal transfer. This fifth aspect of the invention can be particularly advantageous for speeding the manufacture of ID documents such as driver's licenses and other photo ID cards, because thermal transfer printing tends to be quicker than D2T2 printing. In addition, this fifth aspect can of course be used to print variable image data on an ID document To print the full color UV image on-an ID document, we have developed a full color UV thermal ribbon 204, as illustrated in FIG. 9, in accordance with one embodiment of the invention. The full color UV thermal ribbon 204 comprises yellow, cyan, magenta, and K panels 152, 154, 156, 170, respectively, as well as a "Z" panel 206. The Z panel 206 is subdivided further into three colored UV sub-panels, which are shown for illustrative purposes as red UV 208, green UV 210, and blue UV 212 panels. In addition, although the colored sub panels 208, 210, and 212 are shown to be equivalent in size (e.g., each colored sub panel being about ⅓ of the size of the Z panel 206) the invention is not limited to that size. Providing the three colored sub panels enables all the printing of full color.

Note also that, in at least one embodiment of the invention, the Z panel comprises two colored UV sub panels and is capable of producing a so-called "false two color image", in the manner described below.

Figure 15:
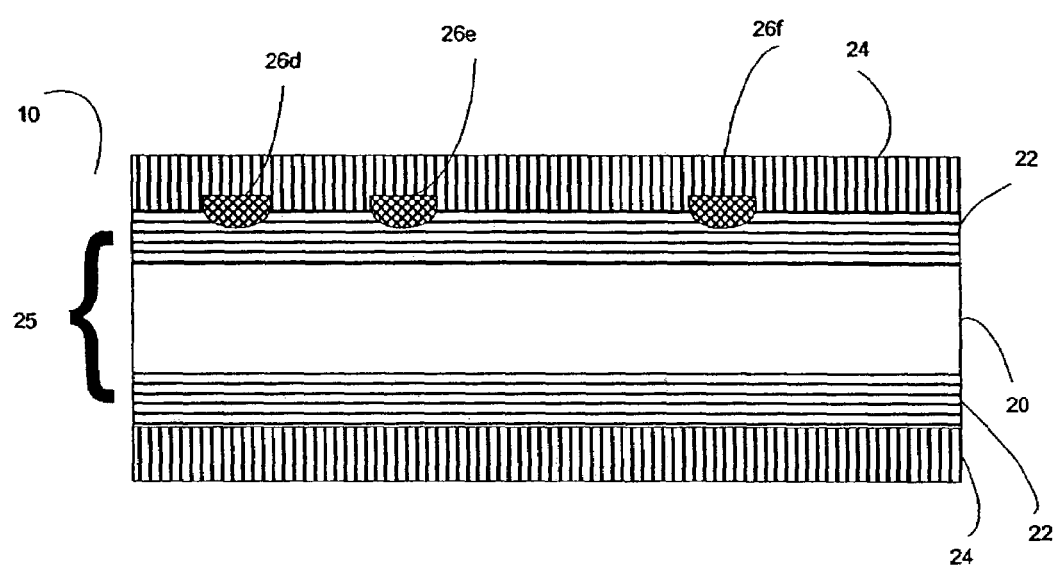
FIG. 15 is a cross section of the ID document of FIG. 3A, taken along the 1C line, in accordance with one embodiment of the invention.

Each colored UV sub panel 208, 210, 212 comprises thermally diffuseable UV dyes dissolved in a resin. Use of thermally diffuseable UV dyes in a resin used in a conventional thermal/mass transfer ribbon improves the printing and security of a UV image formed on a substrate because the resultant image is formed both on top of and into the substrate. This is illustrated more particularly in FIG. 15, which illustrates a cross section of an ID document 10 that has been printed using the full color thermal UV ribbon 204. The ID document 10 has similar composition to the ID document 10 of FIG. 1, except it can be seen that the printed information 26c–26f does not merely sit on top of the PVC 22, but in fact is disposed both on top of and into the PVC. 22. This occurs with the thermal printing using the full color thermal UV ribbon 204 because the UV colors in the Z panel 206 each comprise a solid solution of a thermally diffusible UV fluorescent dye dissolved in the resin. The heating of the full color thermal UV ribbon 204 during printing permits the UV dyes in the Z panel 206 to diffuse into the PVC 22. Thus, when a pixel (or megapixel) is printed on a receiver layer such as the PVC 22, a portion of the UV dyes in the Z panel 206 are diffused into the receiver layer (e.g., PVC 22), while the remaining portion remains on top of the card. For example, it is possible that about 10% of the UV dyes diffuse into the PVC 22 while the remaining 90% sit on top of the PVC 22 (although these proportions are not limiting).

Security of the full color UV image printed on the card is increased as compared to known methods, because the full color UV image that is printed is actually present in two places: in the PVC 22 and on top of the PVC 22. Attempts to fraudulently alter and ID document printed in this manner can be thwarted by the fact that even if the over laminate 24 is removed, a detectable amount of full color UV printing remains within the laminate 22.

In at least one embodiment, it is preferred that the full color UV image printed using the Z panel be printed with a resolution of at least 600 dots per inch (dpi), to provide a photo quality image for identification purposes. For a 600 dpi resolution, the full color UV thermal ribbon 204 and the thermal print head (not shown, but substantially similar to the thermal print head of FIG. 16) are constructed and arranged to operate to print at least two levels of color in a given pixel.

In another embodiment, it is preferred that the full color UV image printed using the Z panel be printed with a resolution of at least 300 dots per inch (dpi). For a 300 dpi resolution, the full color UV thermal ribbon 204 and the thermal print head are constructed and arranged to operate to print at least 4–6 levels of color in a given pixel.

One way to achieve multiple color levels of color is through the use of so-called megapixels. A megapixel is created by dividing a given pixel into a plurality of sub-pixels, such that (using a square pixel, for example) an n-by-n megapixel is formed. Thus, instead of a given pixel being "on" or "off", a given pixel can have 5 different levels of shading. This is illustrated for the example 2 by 2 megapixel of FIG. 10A–E, which shows, 5 different levels of shading (including zero or no shading), representing 5 different levels of density.

Sixth Aspect of the Invention

In this aspect of the invention, any of the embodiments provided in the first through fifth aspects described above can also be utilized where the UV fluorescing compounds/colorants/inks/dyes are replaced with an IR fluorescing compounds/colorants/inks/dyes. These IR dyes then react when illuminated with IR light. Those skilled in the art will readily perceive how to adapt the first through fifth aspects of the invention for use with IR.

Seventh Aspect of the Invention

In this aspect of the invention, a blend of UV and IR compounds/colorants/inks/dyes can be used to further increase card security. As an example, for multiple invisible colors used on a given card, one color is seen under UV illumination and another color is seen in IR illumination. An example of this is shown in FIG. 3F, which illustrates an ID document 100 showing the images that appear under UV illumination and IR illumination (it will be appreciated that FIG. 3F is showing both the UV and IR images simultaneously purely for illustrative purposes). The ID document 100 of FIG. 3F shows first portrait image 600 printed with a first UV colorant and visible only when the ID document 100 is subject to UV illumination, as well as a second portrait image 602 printed with a first IR colorant and visible only when the ID document 100 is subject to IR illumination.

In at least one embodiment of this aspect, the UV and IR components can be part of the same ribbon and printed to the ID document at the same time, using either D2T2 or mass transfer printing. The combination of UV and IR also can be printed to the same image. So, for example, a given image (e.g., a portrait on an ID card) could be printed entirely in a yellow UV color and entirely in a magenta IR color. These UV and UR images can be wholly or partially superimposed, or positioned on entirely separate parts of the ID document. Thus, a given image could show a yellow color when viewed using a UV light source and, either in the same location or a different location, a magenta version of the image can be visible when viewed using and IR source. And, neither: image will be viewable using only visible light (although either or both of the UV and IR could be superimposed, wholly or partially, on one or more visible images).

Many combinations are possible in this aspect of the invention. In one combination, the photograph is augmented with UV dyes, while the text is augmented with IR dyes, or vice versa. In another combination, a "ghost image" is seen under IR illumination, while other features are visible with UV illumination. Those skilled in the art will appreciate that many implementations of this aspect are possible Concluding Remarks One of ordinary skill in the art will appreciate that information than the types of information described herein could be similarly provided on any ID document. Similarly, one of ordinary skill in the art will appreciate, in light of the teachings provided herein, that some of the information could be printed using a reverse format. Further, one of skill in the art will appreciate that the information could be distributed among a plurality of layers that lie beneath an overlaminate layer. Thus, this disclosure is not intended to be limited to providing the information in a particular orientation or to a particular surface.

In addition to the printing methods discussed herein, information on the ID documents (especially non-UV information) can be provided on the desired surface using any known techniques. For example, affixing the information could include any process in which a marking material is applied to a substrate to generate a permanent mark. Thus, one skilled in the art will appreciate that the invention can be adapted for color and/or black and white printing techniques, such as photogravure, flexographic and lithographic printing, printing by means of ink jet printers (using solid or liquid inks), phase change printers, laser printing, laser engraving and electro photographic printing.

It also will be appreciated by those of ordinary skill in the art that several print technologies including but not limited to indigo (variable offset) laser xerography (variable printing), offset printing (fixed printing) and inkjet (variable printing) can be used to print information on the ID document. The information can be printed using dots or lines of varying colors to form text or images. The information also can comprise process colors or pantone colors. The multiple image features can include personal information in a color format.

Persons skilled in the printing art will appreciate that with some of these printing techniques, the "inks" used need not necessarily be conventional liquid inks but also could be solid phase change inks, solid colors, dyes, etc. This disclosure is intended to include any means of affixing the information to a particular desired surface.

Having described and illustrated the principles of the technology with reference to specific implementations, it will be recognized that the technology can be implemented in many other, different, forms.

Although certain words, languages, phrases, terminology, and product brands have been used herein to describe the various features of the embodiments of the invention, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include at least the technology detailed in the section above entitled "Related Application Data". It is specifically contemplated that the invention disclosed herein is to be used with the following disclosures 60/371,335, Attorney Docket No. P0609—Inventors: Nelson Schneck and Charles Duggan, filed Apr. 9, 2002); and Image Processing Techniques for Printing Identification Cards and Document (Application number not yet assigned, Attorney Docket No. P0720D, filed Nov. 25, 2002—Inventors: Nelson Schneck and Chuck Duggan.

Instead of ID documents, the inventive techniques can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

To provide a comprehensive disclosure without unduly lengthening the specification, applicant hereby incorporates by reference each of the patents and patent applications referenced above.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

The invention claimed is:

1. A method for manufacturing an identification document, comprising:
  providing a thermal transfer printing medium comprising a first panel, the first panel comprising a color component that is not visible to the human eye in ambient light but is visible to the human eye when viewed using a first type of light, and wherein the first color component comprises a thermally diffuseable dye dissolved in a resin; and
  applying heat to a portion of the first panel so as to form a first variable indicium on a substrate, where the first variable indicium is not visible to the human eye in ambient light but is visible to the human eye when viewed using the first type of light,
  wherein the first variable indicium comprises a false two color image.

2. A method for manufacturing an identification document, comprising:
  providing a thermal transfer printing medium comprising a first panel, the first panel comprising a color component that is not visible to the human eye in ambient light but is visible to the human eye when viewed using a first type of light;
  applying heat to a portion of the first panel so as to form a first variable indicium on a substrate, where the first variable indicium is not visible to the human eye in ambient light but is visible to the human eye when viewed using the first type of light, and wherein the first variable indicium is a least partially superimposed over the second variable indicium,
  wherein the thermal transfer printing medium further comprises a second thermal transfer panel, the second thermal transfer panel comprising a colorant visible to the human eye in a second type of light, the second type of light being different than the first type of light, and wherein the second thermal transfer panel further comprises a covert colorant that is invisible to the human eye in ambient light;
  printing a second variable indicium on the substrate using the second thermal transfer panel, the second variable indicium being visible when viewed using the second type of light, wherein the second variable indicium is viewable in both ambient light and in the first type of light,
  wherein the second variable indicium comprises a substantially black indicium, whereby the substantially black indicium appears to glow in a first color when viewed using the first type of light.

3. An identification document, comprising:
  substrate;
  a first variable indicium printed to the substrate using a thermal transfer printing medium comprising a first panel, the first panel comprising a color component that is not visible to the human eye in ambient light but is visible to the human eye when viewed using a first type of light, wherein the first variable indicium is not visible to the human eye in ambient light but is visible to the human eye when viewed using the first type of light; and
  wherein the substrate further comprises a second variable indicium, the second variable indicium being visible to the human eye in a second type of light, and
  wherein the first variable indicium conveys substantially the same information as the second variable indicium.

4. The identification document of claim 3, wherein the first variable indicium comprises substantially the same indicium as the second variable indicium.

5. An identification document comprising:
  a substrate; and
  a first variable indicium printed to the substrate using a thermal transfer printing medium comprising a first panel, the first panel comprising a color component that is not visible to the human eye in ambient light but is visible to the human eye when viewed using a first type of light, wherein the first variable indicium is not visible to the human eye in ambient light but is visible to the human eye when viewed using the first type of light;
  wherein the substrate further comprises a second variable indicium, the second variable indicium being visible to the human eye in a second type of light, and
  wherein the first variable indicium overlays at least a portion of the second variable indicium.

6. An identification document, comprising:
  a substrate; and
  a first variable indicium printed to the substrate using a thermal transfer printing medium comprising a first panel, the first panel comprising a color component that is not visible to the human eye in ambient light but is visible to the human eye when viewed using a first type of light wherein the first variable indicium is not visible to the human eye in ambient light but is visible to the human eye when viewed using the first type of light;
  wherein the substrate further comprises a second variable indicium, the second variable indicium being visible to the human eye in a second type of light, and
  wherein the first variable indicium is printed in registration with the second variable indicium.

7. A thermal transfer medium comprising a carrier layer having formed thereon a first thermal transfer panel, the first thermal transfer panel comprising a first layer, the first layer comprising a first colorant that is capable of printing an image that is substantially invisible to the human eye when viewed in ambient light, the first colorant comprising at least one of an ultraviolet dye, an ultraviolet pigment, an ultraviolet ink, an infrared dye, an infrared pigment, and an infrared ink, wherein the first thermal transfer panel further comprises a second layer including a second colorant adapted to image substrates by the thermal layer being disposed adjacent to the first layer, wherein the second colorant comprises a colorant that is capable of printing an image that is substantially visible to the human eye when viewed in ambient light, and wherein the first and second layers are constructed and arranged to be substantially miscible with each other.

* * * * *